United States Patent
Kim et al.

(10) Patent No.: US 9,620,788 B2
(45) Date of Patent: Apr. 11, 2017

(54) ELECTRODE CATALYST FOR FUEL CELL, ELECTRODE FOR FUEL CELL INCLUDING THE ELECTRODE CATALYST, AND MEMBRANE ELECTRODE ASSEMBLY AND FUEL CELL INCLUDING THE SAME

(71) Applicant: SAMSUNG SDI CO., LTD., Yongin-si, Gyeonggi-do (KR)

(72) Inventors: Jun-Young Kim, Yongin-si (KR); Sung-Chul Lee, Yongin-si (KR); Myoung-Ki Min, Yongin-si (KR); Tae-Yoon Kim, Yongin-si (KR); Hee-Tak Kim, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 622 days.

(21) Appl. No.: 14/050,617

(22) Filed: Oct. 10, 2013

(65) Prior Publication Data

US 2014/0335437 A1  Nov. 13, 2014

Related U.S. Application Data

(60) Provisional application No. 61/820,272, filed on May 7, 2013.

(51) Int. Cl.
*H01M 4/92* (2006.01)
*H01M 4/90* (2006.01)

(52) U.S. Cl.
CPC ......... *H01M 4/926* (2013.01); *H01M 4/9083* (2013.01); *Y02E 60/50* (2013.01)

(58) Field of Classification Search
CPC ...... H01M 4/926; H01M 4/9083; Y02E 60/50
See application file for complete search history.

(56) References Cited

U.S. PATENT DOCUMENTS 7,993,797 B2  8/2011  Salguero et al.
2005/0233183 A1  10/2005  Hampden-Smith et al.
(Continued)

FOREIGN PATENT DOCUMENTS

KR   10-0891337 B1  3/2009
KR   10-2012-0056900 A  6/2012

*Primary Examiner* — Nicholas P D'Aniello
*Assistant Examiner* — Philip A Stuckey
(74) *Attorney, Agent, or Firm* — Lee & Morse, P.C.

(57) ABSTRACT

An electrode catalyst for a fuel cell, an electrode, a fuel cell, and a membrane electrode assembly (MEA), the electrode catalyst including a carbonaceous support, and a catalyst metal loaded on the carbonaceous support, wherein the carbonaceous support includes a functional group bound on a surface thereof, the functional group being represented by one of Formula 1 or Formula 2, below,

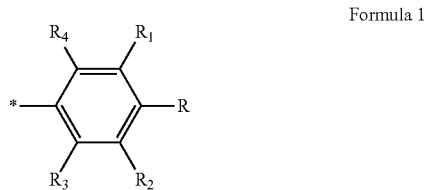

Formula 1

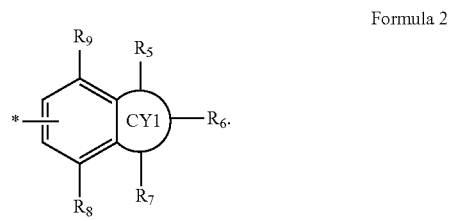

Formula 2

19 Claims, 12 Drawing Sheets

[Reaction Scheme 2]

(56) References Cited

U.S. PATENT DOCUMENTS

2005/0244644 A1   11/2005  Hampden-Smith et al.
2007/0231671 A1*  10/2007  Inasaki ............... H01B 1/122
                                                     429/483
2008/0145743 A1*   6/2008  Choi ................. H01M 4/8605
                                                     429/524

\* cited by examiner

[Reaction Scheme 1]

[Reaction Scheme 2]

ELECTRODE CATALYST FOR FUEL CELL, ELECTRODE FOR FUEL CELL INCLUDING THE ELECTRODE CATALYST, AND MEMBRANE ELECTRODE ASSEMBLY AND FUEL CELL INCLUDING THE SAME

CROSS-REFERENCE TO RELATED APPLICATION

The present application claims priority under 35 U.S.C. §119(e) to U.S. Provisional Application No. 61/820,272, filed on May 7, 2013, and entitled: "ELECTRODE CATALYST FOR FUEL CELL, ELECTRODE FOR FUEL CELL INCLUDING THE ELECTRODE CATALYST, AND MEMBRANE ELECTRODE ASSEMBLY AND FUEL CELL INCLUDING THE SAME," which is incorporated herein by reference in its entirety.

BACKGROUND

1. Field

Embodiments relate to an electrode catalyst for a fuel cell, an electrode for a fuel cell including the electrode catalyst, and a membrane electrode assembly and fuel cell including the same.

2. Description of the Related Art

According to types of an electrolyte and fuel used, fuel cells may be classified as, e.g., polymer electrolyte membrane fuel cells (PEMFCs), direct methanol fuel cells (DMFCs), phosphoric acid fuel cells (PAFCs), molten carbonate fuel cells (MCFCs), or solid oxide fuel cells (SOFCs).

PEMFCs may be a promising alternative system to other energy conversion devices due to their, e.g., high efficiency, high power density, low operation temperature, and environmental friendliness.

For example, a PEMFC may include a membrane-electrode assembly (MEA). The MEA may include an anode, a cathode, and a polymer electrolyte membrane interposed between the anode and the cathode. The anode may include a catalyst layer for catalyzing the oxidation of fuel. The cathode may include a catalyst layer for catalyzing the reduction of an oxidant.

SUMMARY

Embodiments are directed to an electrode catalyst for a fuel cell, an electrode for a fuel cell including the electrode catalyst, and a membrane electrode assembly and fuel cell including the same.

The embodiments may be realized by providing an electrode catalyst for a fuel cell, the electrode catalyst including a carbonaceous support, and a catalyst metal loaded on the carbonaceous support, wherein the carbonaceous support includes a functional group bound on a surface thereof, the functional group being represented by one of Formula 1 or Formula 2, below,

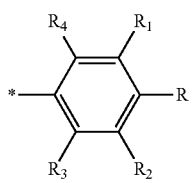

Formula 1

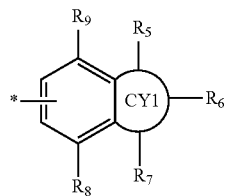

Formula 2 in Formula 1, R is a C1-C10 fluoroalkyl group, a C1-C10 fluoroalkoxy group, a C2-C10 fluoroalkenyl group, a C2-C10 fluoroalkynyl group, a C6-C10 fluoroaryl group, —$NH_2$, —SH, —CN, —$SO_3H$, —COOH, or a combination thereof, in Formula 1, $R_1$ and $R_2$ are each independently a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof, in Formula 1, $R_3$ and $R_4$ are each independently a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof, in Formula 2, CY1 is an aromatic ring, an aromatic heterocyclic ring, or a C2-C6 aromatic heterocyclic ring linked with an aromatic ring, in Formula 2, $R_6$ is hydrogen, a C1-C10 fluoroalkyl group, a C1-C10 fluoroalkoxy group, a C2-C10 fluoroalkenyl group, a C2-C10 fluoroalkynyl group, a C6-C10 fluoroaryl group, —$NH_2$, —SH, —CN, —$SO_3H$, —COOH, or a combination thereof, in Formula 2, $R_5$, $R_7$, $R_8$, and $R_9$ are each independently hydrogen, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof, and * represents a binding site with the surface of the carbonaceous support.

The functional group represented by Formula 1 may be represented by the following 3,

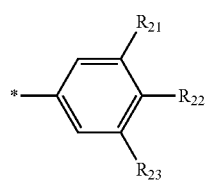

Formula 3 wherein, in Formula 3 $R_{22}$ is a C1-C10 fluoroalkyl group, a C1-C10 fluoroalkoxy group, a C6-C10 fluoroaryl group, —NH$_2$, —SH, —CN, —SO$_3$H, —COOH, or a combination thereof, and R$_{21}$ and R$_{23}$ are each independently a substituted or unsubstituted C1-C40 alkyl group, a substituted or unsubstituted C1-C40 alkoxy group, a substituted or unsubstituted C6-C40 aryl group, or a combination thereof.

The functional group represented by Formula 1 may be represented by one of the following Formulae 4 to 7:

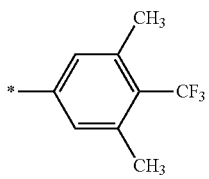

Formula 4

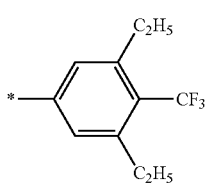

Formula 5

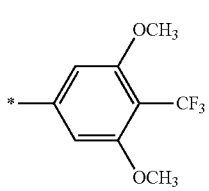

Formula 6

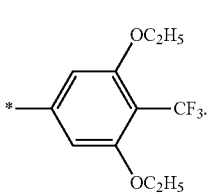

Formula 7

The carbonaceous support may include at least one of carbon powder, carbon black, acetylene black, ketjen black, active carbon, carbon nanotubes, carbon nanofibers, carbon nanowires, carbon nanohorns, ordered nanoporeous carbon, carbon aerogels, carbon cryogels, carbon nanorings, carbon nanocage, and mesoporous carbon.

A doped amount of fluorine in the carbonaceous support may be about 0.1 at. % to about 10 at. %.

A mole ratio of the doped fluorine to carbon (F/C) in the carbonaceous support may be about 0.0001 to about 0.5.

The carbonaceous support may have a specific surface area of about 50 m$^2$/g to about 800 m$^2$/g.

The catalyst metal may include at least one of platinum, iron, cobalt, nickel, ruthenium, rhodium, palladium, osmium, iridium, copper, silver, gold, tin, titanium, chromium, and alloys thereof.

The electrode catalyst may have a D50 average particle diameter of about 1.5 nm to about 8.0 nm.

The carbonaceous support may be prepared by thermally treating carbon at a temperature of about 1,500° C. to about 3,000° C.

The functional group represented by Formula 1 or Formula 2 may be arranged in a uniform monolayer on the surface of the carbonaceous support.

The carbonaceous support has a maximum peak intensity ratio of D band to G band (ID/IG) of about 0.1 to about 1.0, the G band appearing at about 1,575 cm$^{-1}$ to about 1,600 cm$^{-1}$, the D band appearing at about 1,340 cm$^{-1}$ to about 1,360 cm$^{-1}$, as analyzed by Raman spectroscopy using a laser of 514.5 nm wavelength.

The carbonaceous support may have a peak of a 002 plane that appears at a Bragg angle 2θ of 26.4°±0.1° and that has a full width at half maximum of about 0.2° to about 0.7°, in an X-ray diffraction spectrum.

In Formula 1, R$_1$ and R$_2$ may each independently be a substituted or unsubstituted C1-C40 alkyl group or a substituted or unsubstituted C1-C40 alkoxy group.

In Formula 1, R$_1$ and R$_2$ may each independently be one of a methyl group, an ethyl group, a methoxy group, or an ethoxy group.

The functional group may form a functional layer that forms a barrier that suppresses migration or aggregation of catalyst metal particles.

In Formula 1, R$_1$ and R$_2$ may be the same.

The embodiments may also be realized by providing an electrode for a fuel cell, the electrode including the electrode catalyst according to an embodiment.

The embodiments may also be realized by providing a fuel cell, the fuel cell including the electrode according to an embodiment.

The embodiments may also be realized by providing a membrane electrode assembly for a fuel cell, the membrane electrode assembly including the electrode catalyst according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
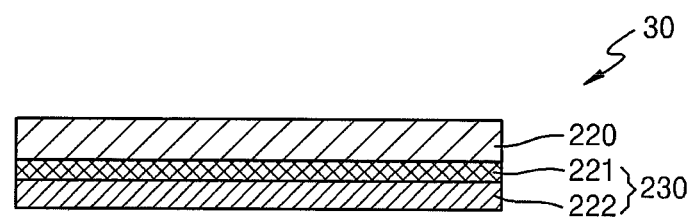
FIG. 1 illustrates a schematic cross-sectional view of an electrode for a fuel cell according to an embodiment.

The embodiments will now be described more fully with reference to the accompanying drawings, in which exemplary embodiments are shown. The embodiments may, however, be embodied in many different forms without departing from the spirit and scope of the embodiments and should not be construed as being limited to the embodiments set forth herein.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

According to an embodiment, an electrode catalyst for a fuel cell may include a carbonaceous support; and a catalyst metal loaded on the carbonaceous support. The carbonaceous support may include at least one of a functional group of Formula 1 and a functional group of Formula 2 below bound to a surface thereof.

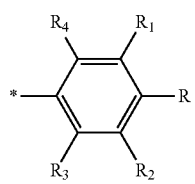

[Formula 1]

In Formula 1, R may be a C1-C10 fluoroalkyl group, a C1-C10 fluoroalkoxy group, a C2-C10 fluoroalkenyl group, a C2-C10 fluoroalkynyl group, a C6-C10 fluoroaryl group, —NH$_2$, —SH, —CN, —SO$_3$H, —COOH, or a combination thereof.

R$_1$ and R$_2$ may each independently be a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof.

R$_3$ and R$_4$ may each independently be a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof.

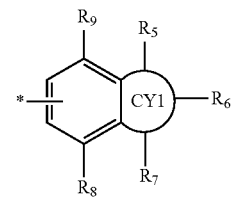

[Formula 2]

In Formula 2, CY1 may be an aromatic ring, an aromatic heterocyclic ring, or a C2-C6 aromatic heterocyclic ring linked with an aromatic ring. In an implementation, CY1 may be a ring selected from the group of a benzene ring, a naphthalene ring, a phenanthrene ring, an anthracene ring, a pyrene ring, and a derivative thereof.

R$_6$ may be a hydrogen, a C1-C10 fluoroalkyl group, a C1-C10 fluoroalkoxy group, a C2-C10 fluoroalkenyl group, a C2-C10 fluoroalkynyl group, a C6-C10 fluoroaryl group, —NH$_2$, —SH, —CN, —SO$_3$H, —COOH, or a combination thereof.

R$_5$, R$_7$, R$_8$, and R$_9$ may each independently be hydrogen, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof.

In Formulae 1 and 2, and the Formulae below, * indicates a binding site of the functional group to the surface of the carbonaceous support.

In an implementation, R$_1$ and R$_2$ may each independently be a substituted or unsubstituted C1-C40 alkyl group or a substituted or unsubstituted C1-C40 alkoxy group. In an implementation, R$_1$ and R$_2$ may each independently be one of a methyl group, an ethyl group, a methoxy group, or an ethoxy group. In an implementation, R$_1$ and R$_2$ may be the same.

Definitions of the substituents in Formula 1 are as follows.

The term "substituted" used to define the alkyl group, alkoxy group, alkenyl group, alkynyl group, alkylene oxide group, cycloalkyl group, aryl group, aryloxy group, and heteroaryl group in Formula 1 refers to substitution of these groups with a halogen atom, a C1-C20 alkyl group substituted with a halogen atom (for example, $CCF_3$, $CHCF_2$, $CH_2F$, or $CCl_3$), a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

Non-limiting examples of the C1-C40 alkyl group in Formula 1 may include methyl, ethyl, propyl, isobutyl, sec-butyl, tert-butyl, neo-butyl, iso-amyl, and hexyl. At least one hydrogen atom in these alkyl groups may be substituted with those substituents listed above in conjunction with the definition of the term "substituted".

Examples of the C1-C40 alkoxy group in Formula 1 may include methoxy, ethoxy, and propoxy. At least one hydrogen atom in these alkoxy groups may be substituted with those substituents described above in conjunction with the term "substituted".

Examples of the C2-C40 alkenyl group in Formula 1 may include vinylene, allylene, and the like. At least one hydrogen atom in these alkenyl groups may be substituted with those substituents described above in conjunction with the term "substituted".

An example of the C2-C40 alkynyl group in Formula 1 may include acetylene. At least one hydrogen atom in the alkynyl group may be substituted with those substituents described above in conjunction with the term "substituted".

Examples of the C2-40 alkylene oxide group in Formula 1 may include ethylene oxide, propylene oxide, and butylene oxide.

Examples of the C3-C40 cycloalkyl group in Formula 1 may include cyclopropyl, cyclobutyl, cyclopentyl, and cyclohexyl. At least one hydrogen atom in these cycloalkyl groups may be substituted with those substituents described above in conjunction with the term "substituted".

The C6-40 aryl group in Formula 1 may be used alone or in combination, and may refer to an aromatic system including at least one ring. Examples of the aryl group may include phenyl, naphthyl, and tetrahydronaphthyl. At least one hydrogen atom in the aryl group may be substituted with those substituents as described above in conjunction with the term "substituted".

An example of the C6-C40 aryloxy group in Formula 1 may include a phenoxy group. At least one hydrogen atom in the aryloxy group may be substituted with those substituents described above in conjunction with the term "substituted".

The C6-40 heteroaryl group in Formula 1 may refer to an organic compound including at least one heteroatom selected from nitrogen (N), oxygen (O), phosphorous (P), and sulfur (S), and the remainder being carbon. An example of the C6-30 heteroaryl group may include pyridyl. At least one hydrogen atom in the heteroaryl group may be substituted with those substituents described above in conjunction with the term "substituted".

The carbonaceous support may include at least one functional group of a hydrophobic fluorinated substituent, an aryl group having a substituent, such as $-NH_2$, $-SH$, $-CN$, $-SO_3H$, or $-COOH$, or a C2-C6 condensed polycyclic aromatic ring bound to the surface thereof. The "condensed polycyclic aromatic ring" may include, e.g., a naphthalene ring, an anthracene ring, a pentacene ring, a phenanthrene ring, or a pyrene ring.

The carbonaceous support may help suppress migration of catalyst metal particles, and may serve as an effective barrier for preventing aggregation of the catalyst metal particles. Accordingly, less water may reach the carbonaceous support, so that the carbonaceous support may be less vulnerable to oxidation and may have improved durability and performance. For example, the functional group may form a functional layer that forms a barrier that suppresses migration or aggregation of catalyst metal particles. In an implementation, the functional group represented by Formula 1 or Formula 2 may be arranged in a uniform monolayer on the surface of the carbonaceous support The carbonaceous support may include a functional group represented by Formula 3, below, bound to the surface thereof. For example, the functional group represented by Formula 1 may be represented by Formula 3.

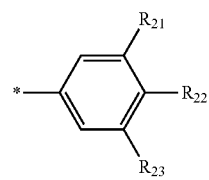

[Formula 3]

In Formula 3, $R_{22}$ may be a C1-C10 fluoroalkyl group, a C1-C10 fluoroalkoxy group, a C6-C10 fluoroaryl group, $-NH_2$, $-SH$, $-CN$, $-SO_3H$, $-COOH$, or a combination thereof.

$R_{21}$ and $R_{23}$ may each independently be a substituted or unsubstituted C1-C40 alkyl group, a substituted or unsubstituted C1-C40 alkoxy group, a substituted or unsubstituted C6-C40 aryl group, or a combination thereof.

When the carbonaceous support further includes a substituent, e.g., a linear carbon chain functional group, such as a substituted or unsubstituted C1-C40 alkyl group, or a substituted or unsubstituted C1-C40 alkoxy group, in addition to a hydrophobic fluorinated substituent, $-NH_2$, $-SH$, $-CN$, $-SO_3H$, or $-COOH$, the fluorinated functional group may facilitate growth of a uniform monolayer on the surface of the carbonaceous support.

The carbonaceous support may include a functional group represented by one of Formulae 4 to 7, below, bound to the surface of the carbonaceous support. For example, the functional group represented by Formula 1 may be represented by one of the following Formulae 4 to 7.

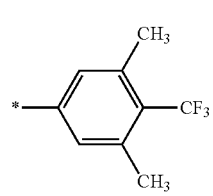

[Formula 4]

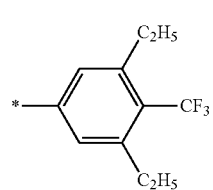

[Formula 5]

[Formula 6]

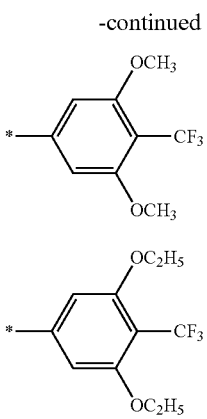

[Formula 7]

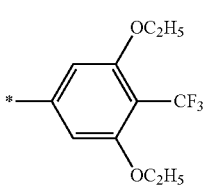

The carbonaceous support may be obtained using a diazonium derivative. Such a carbonaceous support obtained using a diazonium derivative may have a modified surface without deterioration in electrochemical characteristics of carbon.

The carbonaceous support may include at least one selected from the group of carbon powder, carbon black, acetylene black, ketjen black, active carbon, carbon nanotubes, carbon nanofibers, carbon nanowires, carbon nanohorns, ordered nanoporous carbon, carbon aerogels, carbon cryogels, carbon nanorings, carbon nanocage, and mesoporous carbon.

The carbonaceous support may have a maximum peak intensity ratio of D band to G band ($I_D/I_G$) of about 0.1 to about 1.0, e.g., about 0.2 to about 0.8, the G band appearing at about 1575 $cm^{-1}$ to about 1,600 $cm^{-1}$, the D band appearing at about 1,340 $cm^{-1}$ to about 1,360 $cm^{-1}$, as analyzed by Raman spectroscopy using a laser of 514.5 nm wavelength.

In an X-ray diffraction (XRD) spectrum of the carbonaceous support, a peak of the 002 plane may appear at a Bragg angle 2θ of 26.4°±0.1° and may have a full width at half maximum (FWHM) of about 0.2° to about 0.7°.

When the carbonaceous support has a $I_D/I_G$ or/and a (002)-plane FWHM within these ranges, reaction with diazonium derivative may be facilitated without changes in the surface structure and electrochemical characteristics of carbon. This reaction may consequently facilitate binding of a fluorinated substituent and other substituents to the surface of the carbonaceous support, thus improving durability and performance of the carbonaceous support. Accordingly, a fuel cell including the carbonaceous support may have improved electrochemical performance.

A doped amount of fluorine (F) in the carbonaceous support may be from about 0.1 at. % to about 10 at. %. A mole ratio of the doped fluorine to carbon (F/C) in the carbonaceous support may be from about 0.0001 to about 0.5.

The carbonaceous support may have a specific surface area of about 50 $m^2/g$ to about 800 $m^2/g$, e.g., about 100 $m^2/g$ to about 700 $m^2/g$. When the carbonaceous support has a specific surface area within these ranges, the surface and electrochemical characteristics of carbon in the carbonaceous support may be maintained, and binding of a fluorinated substituent and other substituents onto the surface of the carbonaceous support may be facilitated.

The catalyst metal of the electrode catalyst may include at least one selected from the group of a platinum (Pt), iron (Fe), cobalt (Co), nickel (Ni), ruthenium (Ru), rhodium (Rh), palladium (Pd), osmium (Os), iridium (Ir), copper (Cu), silver (Ag), gold (Au), tin (Sn), titanium (Ti), chromium (Cr), and an alloy of at least two thereof. For example, the catalyst metal may be Pt or a Pt—Co alloy.

The electrode catalyst for a fuel cell may have an average particle diameter D50 of about 1.5 nm to about 8.0 nm. When the average particle diameter D50 of the electrode catalyst is within this range, the electrode catalyst, along with the carbonaceous support having a specific surface area as defined above, may have improved electrochemical characteristics of the fuel cell.

The electrode catalyst for a fuel cell may be prepared as follows.

A catalyst material including carbon and a catalyst metal, or carbon and an amine compound may be mixed together in a solvent.

The solvent may include, e.g., water, alcohol, or a mixture thereof. Non-limiting examples of the alcohol may include methanol, ethanol, propanol, or a mixture thereof. A mixed solvent of water and alcohol in a ratio of about 5:95 to about 50:50 by volume may be used.

The carbonaceous support may be prepared by thermally treating carbon at a temperature of about 1,500° C. to about 3,000° C. When the temperature of the thermal treatment is within this range, carbon with high crystallinity may be obtained. The carbonaceous support may have a maximum peak intensity ratio of D band to G band ($I_D/I_G$) of about 0.1 to about 1.0, e.g., about 0.2 to about 0.8, the G band appearing at about 1,575 $cm^{-1}$ to about 1,600 $cm^{-1}$, the D band appearing at about 1,340 $cm^{-1}$ to about 1,360 $cm^{-1}$, as analyzed by Raman spectroscopy using a laser of 514.5 nm wavelength. When the thermal treatment is performed within this temperature range, the carbonaceous support may have a specific surface area of about 50 $m^2/g$ to about 800 $m^2/g$. Corrosion of carbon in the carbonaceous support may be prevented. Thus, an electrode catalyst with improved durability may be prepared.

The amine compound may be a compound represented by one of Formulae 8 to 11, below.

[Formula 8]

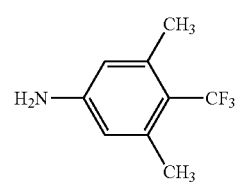

[Formula 9]

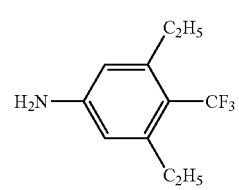

[Formula 10]

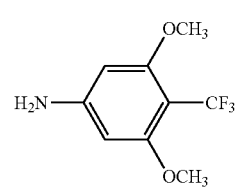

[Formula 11]

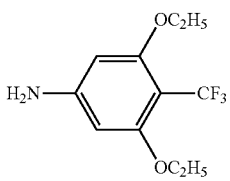

A mixing ratio of carbon to amine compound may be from about 25:1 to about 1.24:1 by weight. When the mixing ratio of carbon to amine compound by weight is within this range, at least one hydrogen in the carbonaceous support may be substituted in an appropriate amount with a fluorinated substituent and other substituents, so that the electrode catalyst may become more hydrophobic.

Next, $NaNO_2$ and HCl may be added into the mixture of carbon and the amine compound. An amount of $NaNO_2$ may be from about 2 moles to about 3 moles, based on 1 mole of the aromatic amine compound. When the amount of $NaNO_2$ is within this range, a diazonium reaction may be facilitated.

An amount of HCl may be from about 500 µl to about 50 ml. HCl may serve as an initiator of the diazonium reaction. When the amount of HCl is within this range, it may effectively initiate the diazonium reaction.

In adding $NaNO_2$ and HCl, $NaNO_2$ may be added first with stirring, followed by adding HCl, or vice versa. In an implementation, $NaNO_2$ and HCl may be added at the same time.

Next, the mixture is stirred at about 50 rpm to about 500 rpm. When the mixing rate is within this range, the carbon or catalyst metal may be appropriately dispersed to induce the diazonium reaction uniformly over the entire surface of the carbonaceous support. The stirring may be performed at a temperature of about 0° C. to about 30° C. When the stirring temperature is within this range, the diazonium reaction may be induced at an appropriate rate.

Figure 15:
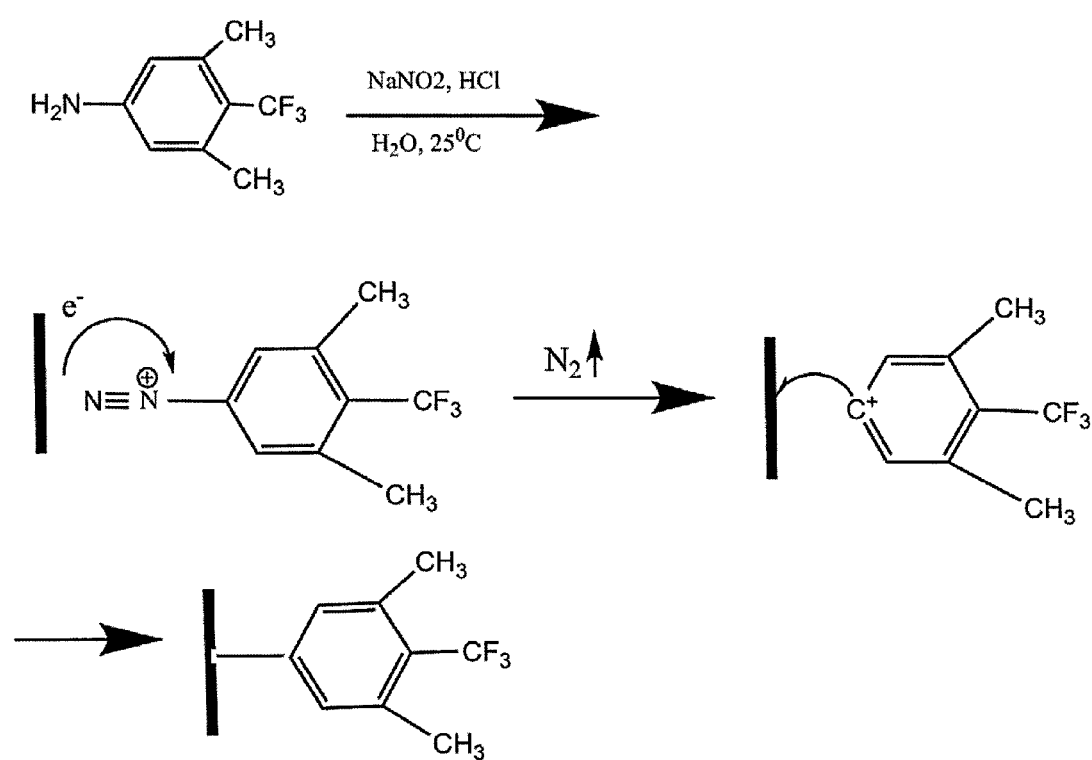
FIG. 15 illustrates Reaction Scheme 1.

The diazonium reaction may occur while the mixture is stirred. A mechanism of the diazonium reaction, e.g., when a compound of Formula 8 above is used as the amine compound, is illustrated in Reaction Scheme 1 of FIG. 15.

Referring to Reaction Scheme 1, an amine group of the compound of Formula 8 may be converted into a diazonium group, and $N_2$ may be removed through electron donation of carbon in the electrode catalyst so that 2,6-dichloro-4-trifluoride phenyl group may be bound to the surface of the carbon.

Figure 16:
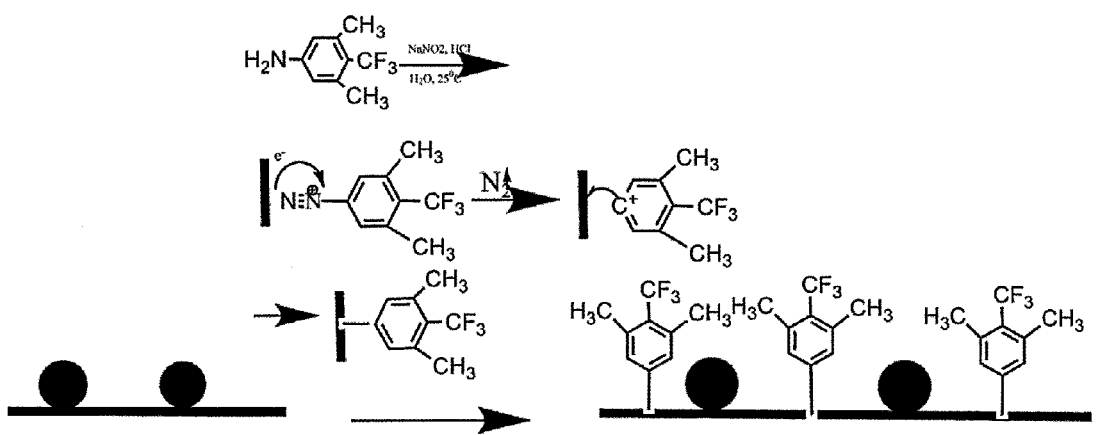
FIG. 16 illustrates Reaction Scheme 2.

For example, binding of the 2,6-dichloro-4-trifluoride phenyl group onto an electrode catalyst including a catalyst metal loaded on a carbonaceous support is illustrated in Reaction Scheme 2 of FIG. 16.

As illustrated in Reaction Scheme 2, the 2,6-dichloro-4-trifluoride phenyl group may be bound to the surface of the carbonaceous support.

Next, the stirred product may be dried. The drying may be performed for about 1 hour to about 24 hours. In an implementation, an additional process, e.g., filtering, washing, or the like, may be performed before the drying. The washing may be performed, e.g., with water, methanol, acetone, tetrahydrofuran, or methyl acetate.

Another embodiment provides an electrode for a fuel cell including any of the electrode catalysts according to the embodiments.

FIG. 1 illustrates a schematic crow-sectional view of an electrode according to an embodiment.

Referring to FIG. 1, the electrode 30 may include a gas diffusion layer 230 having a microporous layer 221 disposed on an electrode support 222, and a catalyst layer 220 disposed on the gas diffusion layer 230. In an implementation, the electrode 30 may include the catalyst layer 220 disposed directly on the electrode support 222.

The electrode 30 may be a cathode or an anode.

The electrode support 222 may be carbon paper or carbon cloth, but is not limited thereto. For example, any of a variety of materials with electrical conductivity, such as metal or a carbonaceous material, may be used for the electrode support 222.

The gas diffusion layer 230 may be a suitable and/or commercially available gas diffusion layer. Alternatively, the gas diffusion layer 230 may be prepared by coating a microporous layer 221 directly on a purchased carbon paper.

The gas diffusion layer 230 may have a thickness of about 200 µm to about 400 µm, in view of gas diffusion effect and electric resistance. In an implementation, the gas diffusion layer 230 may have a thickness of from about 100 µm to about 350 µm, e.g., from about 200 µm to about 350 µm.

The gas diffusion layer 230 may be treated to have water repellency. The water-repellency-treated gas diffusion layer 230 may help prevent flooding that may occur when excess electrolyte enters the catalyst layer 220. The flooding may refer to blocking of gas diffusion into the catalyst layer by excess electrolyte.

For example, a material for the water-repellency treatment may include at least one selected from the group of polytetrafluoroethylene (PTFE), fluorinated ethylene propylene (FEP), polyvinylidene fluoride (PVdF), Fluorosarf (available from Fluoro Technology Co., Ltd.), polyhexafluoropropylene, polyperfluoroalkylvinylether, polyperfluorosulfonylfluoridealkoxyvinylether, polychlorotrifluoroethylene, and a copolymer thereof. In an implementation, the material may include a 2,2-bistrifluoromethyl-4,5-difluoro-1,3-dioxol tetrafluoroethylene copolymer.

An amount of the material for the water-repellency treatment may be from about 1 part to about 30 parts by weight, based on 100 parts by weight of a carbonaceous material in the gas diffusion layer 230. When the amount of the material for the water-repellency treatment is within this range, smooth fuel supply may be ensured from the beginning of operation without flooding, which consequently may maintain high cell performance.

The microporous layer 221 may include conductive powder having a small diameter, e.g., carbon powder, carbon black, acetylene black, activated carbon, carbon fibers, fullerene, carbon nanotubes, carbon nanowires, carbon nanohorns, or carbon nanorings.

The catalyst layer 220 may further include a binder resin to transport the above-described catalyst and protons. The catalyst layer 220 may be formed by coating a catalyst composition on the electrode support 222 or the gas diffusion layer 230. The catalyst layer 220 may include a carbonaceous support that includes at least one of a functional group of Formula 1 below or a functional group of Formula 2 below bound to the carbonaceous support.

[Formula 1]

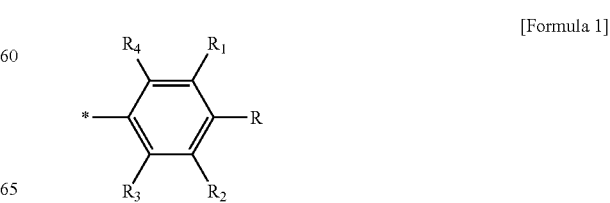

In Formula 1, R may be a C1-C10 fluoroalkyl group, a C1-C10 fluoroalkoxy group, a C2-C10 fluoroalkenyl group, a C2-C10 fluoroalkynyl group, a C6-C10 fluoroaryl group, —$NH_2$, —SH, —CN, —$SO_3H$, —COOH, or a combination thereof.

$R_1$ and $R_2$ may each independently be a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof.

$R_3$ and $R_4$ may each independently be a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof.

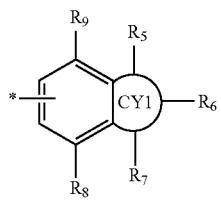

[Formula 2]

In Formula 2, CY1 may be an aromatic ring, an aromatic heterocyclic ring, or a C2-C6 aromatic heterocyclic ring linked with an aromatic ring. In an implementation, CY1 may be a ring selected from the group of a benzene ring, a naphthalene ring, a phenanthrene ring, an anthracene ring, a pyrene ring, and a derivative thereof, $R_6$ may be a hydrogen, a C1-C10 fluoroalkyl group, a C1-C10 fluoroalkoxy group, a C2-C10 fluoroalkenyl group, a C2-C10 fluoroalkynyl group, a C6-C10 fluoroaryl group, —$NH_2$, —SH, —CN, —$SO_3H$, —COOH, or a combination thereof.

$R_5$, $R_7$, $R_8$, and $R_9$ may each independently be hydrogen, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, an unsubstituted C2-C40 alkylene oxide group, a substituted or unsubstituted C3-C40 cycloalkyl group, a substituted or unsubstituted C6-C40 aryl group, a substituted or unsubstituted C6-C40 aryloxy group, a substituted or unsubstituted C6-C40 heteroaryl group, or a combination thereof.

The carbonaceous support may help suppress migration of catalyst metal particles, and may serve as an effective barrier for preventing aggregation of the catalyst metal particles. Accordingly, less water may reach the carbonaceous support, so that the carbonaceous support may be less vulnerable to oxidation and may have improved durability and performance. When the carbonaceous support further includes a linear carbon chain functional substituent, in addition to a fluorinated substituent, the fluorinated functional group may facilitate growth of a uniform monolayer on the surface of the carbonaceous support.

According to another embodiment, an MEA may include a cathode; an anode disposed opposite to the cathode; and an electrolyte membrane disposed between the cathode and the anode. At least one of the cathode and the anode may include any of the electrode catalysts according to the above-described embodiments.

Figure 2:
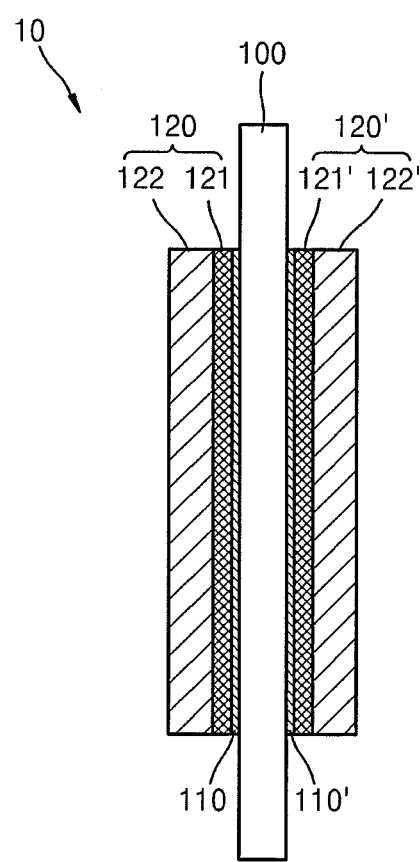
FIG. 2 illustrates a schematic cross-sectional view of a membrane electrode assembly (MEA) according to an embodiment.

FIG. 2 illustrates a schematic cross-sectional view of a membrane electrode assembly (MEA) according to an embodiment.

Referring to FIG. 2, the MEA 10 may include an electrolyte membrane 100, catalyst layers 110 and 110' disposed on lateral sides of the electrolyte membrane 100, and gas diffusion layers 120 and 120' (including electrode supports 122 and 122') respectively stacked on the catalyst layers 110 and 110'. The gas diffusion layers 120 and 120' may further include microporous layers 121 and 121', respectively, in addition to the electrode supports 122 and 122', as illustrated in FIG. 2.

The electrolyte membrane 100 may be a polymer electrolyte membrane. For example, the electrolyte membrane 100 may be at least one polymer electrolyte membrane selected from the group of polybenzimidazole (PBI), cross-linked polybenzimidazole, polybenzoxazine, poly(2,5-benzimidazole (ABPBI), polyurethane, and modified polytetrafluoroethylene (PTFE). The electrolyte membrane 100 is not limited to these polymer electrolyte membranes, and may be a suitable polymer electrolyte membrane.

The electrolyte membrane 100 may be impregnated with phosphoric acid, an organic phosphoric acid, or a non-phosphoric acid. In an implementation, the electrolyte membrane 100 may be impregnated with a phosphoric acid-based material, e.g., polyphosphoric acid, phosphonic acid ($H_3PO_3$), ortho-phosphoric acid ($H_3PO_4$), pyrophosphoric acid ($H_2P_2O_7$), triphosphoric acid ($H_3P_3O_{10}$), metaphosphoric acid, or a derivative thereof. A concentration of the phosphoric acid-based material is not specifically limited. In an implementation, the concentration may be at least about 80 wt %, e.g., about 90 wt %, about 95 wt %, or about 98 wt %. For example, an aqueous phosphoric acid solution of about 80 wt % to about 100 wt % may be used.

The catalyst layers 110 and 110', and the gas diffusion layers 120 and 120' including the electrode supports 122, 122' and/or the microporous layers 121 and 121', respectively, are as described above.

According to another embodiment, a fuel cell may include a cathode; an anode disposed opposite to the cathode; and an electrolyte membrane disposed between the cathode and the anode. At least one of the cathode and the anode may include any of the electrode catalysts according to the above-described embodiments.

Figure 3:
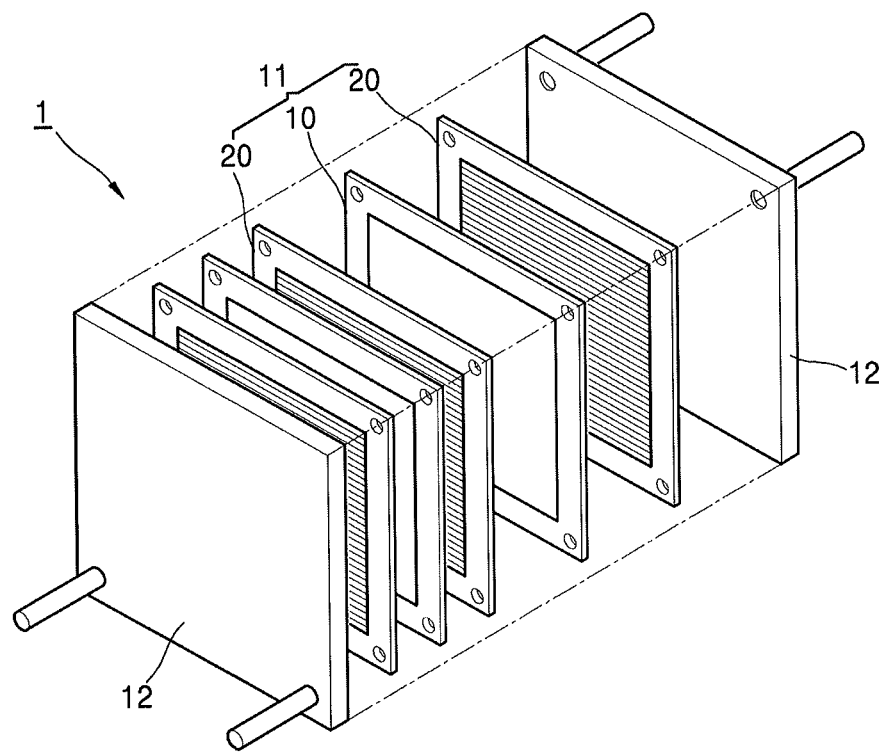
FIG. 3 illustrates an exploded perspective view illustrating a structure of a fuel cell according to an embodiment.

FIG. 3 illustrates an exploded perspective view of a fuel cell 1 according to an embodiment.

Referring to FIG. 3, the fuel cell 1 may include two unit cells 11 supported by a pair of holders 12. Each unit cell 11 may include an MEA 10, and bipolar plates 20 disposed on lateral sides of the MEA 10. Each bipolar plate 20 may include a conductive metal, carbon, or the like, and may be bound to the MEA 10. The bipolar plate 20 may serve as a current collector and may provide oxygen and fuel to a catalyst layer of the corresponding MEA 10.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Preparation Example 1

Preparation of Carbon Support

Ketjen black (ECP 300J, available from Mitsubishi Chemicals) was thermally treated at about 2,500° C. for about 1 hour to prepare a carbonaceous support. The obtained carbonaceous support had a Brunauer-Emmett-Teller (BET) specific surface area of about 127 $m^2/g$.

Preparation Example 2

Preparation of Carbon Support

Ketjen black (ECP 300J, available from Mitsubishi Chemicals) was thermally treated at about 2,250° C. for about 1 hour to prepare a carbonaceous support. The obtained carbonaceous support had a Brunauer-Emmett-Teller (BET) specific surface area of about 150 $m^2/g$.

Preparation Example 3

Preparation of Carbon Support

Ketjen black (ECP 300J, available from Mitsubishi Chemicals) was thermally treated at about 2,000° C. for about 1 hour to prepare a carbonaceous support. The obtained carbonaceous support had a Brunauer-Emmett-Teller (BET) specific surface area of about 166 $m^2/g$.

Comparative Preparation Example 1

Preparation of Carbon Support

Ketjen black (ECP 300J, available from Mitsubishi Chemicals) having a BET specific surface area of about 834 $m^2/g$ was used as a carbonaceous support.

Example 1

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 0.0745 mL (2 mmol) of an amine compound of Formula 8, below, was added into the dispersion and stirred for about 1 hour to obtain a mixture. 0.069 g (4 mmol) of $NaNO_2$ was added into the mixture and then stirred for about 30 minutes, followed by an addition of 5 mL of a 0.5M HCl aqueous solution. The resulting mixture was stirred at room temperature for about 30 minutes to about 24 hours for a diazonium reaction to progress, to obtain a diazonium derivative. The concentration of the resulting diazonium derivative was about 2 mM.

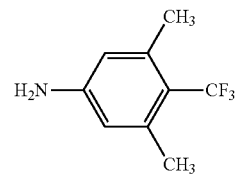

[Formula 8]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 µl of the catalyst composition was coated on a glassy carbon electrode support having a diameter of about 0.5 cm, and then dried at room temperature for about 5 minutes. 7 µl of a 0.05 wt % Nafion solution was dropwise added into the dried product, which was then dried at room temperature for about 10 minutes, thereby manufacturing an electrode. The loading amount of the catalyst was about 85 µg/$cm^2$ on the electrode.

Example 2

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 0.1490 mL (4 mmol) of an amine compound of Formula 8, below, was added into the dispersion and stirred for about 1 hour to obtain a mixture. 0.1380 g (8 mmol) of $NaNO_2$ was added into the mixture and then stirred for about 30 minutes, followed by an addition of 5 mL of a 0.5M HCl aqueous solution. The resulting mixture was stirred at room temperature for about 30 minutes to about 24 hours for a diazonium reaction to progress to obtain a diazonium derivative. The concentration of the resulting diazonium derivative was about 4 mM.

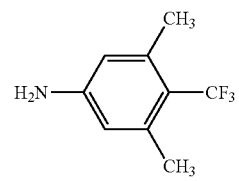

[Formula 8]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 μl of the catalyst composition was coated on a glassy carbon electrode support having a diameter of about 0.5 cm, and then dried at room temperature for about 5 minutes. 7 μl of a 0.05 wt % Nafion solution was dropwise added into the dried product, which was then dried at room temperature for about 10 minutes, thereby manufacturing an electrode. The loading amount of the catalyst was about 85 μg/cm² on the electrode.

Example 3

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 0.2979 mL (8 mmol) of an amine compound of Formula 8, below, was added into the dispersion and stirred for about 1 hour to obtain a mixture. 0.2760 g (16 mmol) of NaNO₂ was added into the mixture and then stirred for about 30 minutes, followed by an addition of 5 mL of a 0.5M HCl aqueous solution. The resulting mixture was stirred at room temperature for about 30 minutes to about 24 hours for a diazonium reaction to progress to obtain a diazonium derivative. The concentration of the resulting diazonium derivative was about 8 mM.

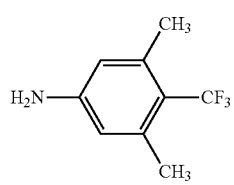

[Formula 8]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 μl of the catalyst composition was coated on a glassy carbon electrode support having a diameter of about 0.5 cm, and then dried at room temperature for about 5 minutes. 7 μl of a 0.05 wt % Nafion solution was dropwise added into the dried product, which was then dried at room temperature for about 10 minutes, thereby manufacturing an electrode. The loading amount of the catalyst was about 85 μg/cm² on the electrode.

Example 4

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 0.5959 mL (16 mmol) of an amine compound of Formula 8, below, was added into the dispersion and stirred for about 1 hour to obtain a mixture. 0.5520 g (32 mmol) of NaNO₂ was added into the mixture and then stirred for about 30 minutes, followed by an addition of 5 mL of a 0.5 M HCl aqueous solution. The resulting mixture was stirred at room temperature for about 30 minutes to about 24 hours for a diazonium reaction to progress to obtain a diazonium derivative. The concentration of the resulting diazonium derivative was about 16 mM.

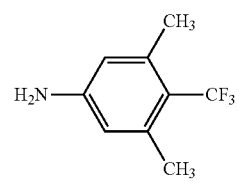

[Formula 8]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 μl of the catalyst composition was coated on a glassy carbon electrode support having a diameter of about 0.5 cm, and then dried at room temperature for about 5 minutes. 7 μl of a 0.05 wt % Nafion solution was dropwise added into the dried product, which was then dried at room temperature for about 10 minutes, thereby manufacturing an electrode. The loading amount of the catalyst was about 85 μg/cm² on the electrode.

Example 5

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 1.1917 mL (32 mmol) of an amine compound of Formula 8, below, was added into the dispersion and stirred for about 1 hour to obtain a mixture. 1.1040 g (64 mmol) of NaNO₂ was added into the mixture and then stirred for about 30 minutes, followed by an addition of 5 mL of a 0.5 M HCl aqueous solution. The resulting mixture was stirred at room temperature for about 30 minutes to about 24 hours for a diazonium reaction to progress to obtain a diazonium derivative. The concentration of the resulting diazonium derivative was about 32 mM.

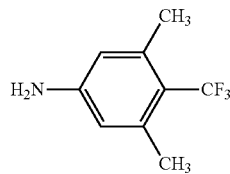

[Formula 8]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 µl of the catalyst composition was coated on a glassy carbon electrode support having a diameter of about 0.5 cm, and then dried at room temperature for about 5 minutes. 7 µl of a 0.05 wt % Nafion solution was dropwise added into the dried product, which was then dried at room temperature for about 10 minutes, thereby manufacturing an electrode. The loading amount of the catalyst was about 85 µg/cm$^2$ on the electrode.

Example 6

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 0.3416 mL (8 mmol) of an amine compound of Formula 9, below, was added into the dispersion and stirred for about 1 hour to obtain a mixture. 0.2760 g (16 mmol) of NaNO$_2$ was added into the mixture and then stirred for about 30 minutes, followed by an addition of 5 mL of a 0.5 M HCl aqueous solution. The resulting mixture was stirred at room temperature for about 30 minutes to about 24 hours for a diazonium reaction to progress to obtain a diazonium derivative. The concentration of the resulting diazonium derivative was about 8 mM.

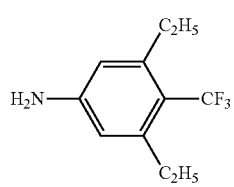

[Formula 9]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 µl of the catalyst composition was coated on a glassy carbon electrode support having a diameter of about 0.5 cm, and then dried at room temperature for about 5 minutes. 7 µl of a 0.05 wt % Nafion solution was dropwise added into the dried product, which was then dried at room temperature for about 10 minutes, thereby manufacturing an electrode. The loading amount of the catalyst was about 85 µg/cm$^2$ on the electrode.

Example 7

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 0.3509 mL (8 mmol) of an amine compound of Formula 10, below, was added into the dispersion and stirred for about 1 hour to obtain a mixture. 0.2760 g (16 mmol) of NaNO$_2$ was added into the mixture and then stirred for about 30 minutes, followed by an addition of 5 mL of a 0.5 M HCl aqueous solution. The resulting mixture was stirred at room temperature for about 30 minutes to about 24 hours for a diazonium reaction to progress to obtain a diazonium derivative. The concentration of the resulting diazonium derivative was about 8 mM.

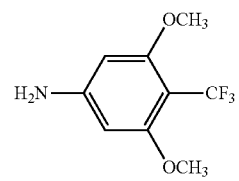

[Formula 10]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 µl of the catalyst composition was coated on a glassy carbon electrode support having a diameter of about 0.5 cm, and then dried at room temperature for about 5 minutes. 7 µl of a 0.05 wt % Nafion solution was dropwise added into the dried product, which was then dried at room temperature for about 10 minutes, thereby manufacturing an electrode. The loading amount of the catalyst was about 85 μg/cm² on the electrode.

Example 8

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 0.3915 mL (8 mmol) of an amine compound of Formula 11, below, was added into the dispersion and stirred for about 1 hour to obtain a mixture. 0.2760 g (16 mmol) of $NaNO_2$ was added into the mixture and then stirred for about 30 minutes, followed by an addition of 5 mL of a 0.5 M HCl aqueous solution. The resulting mixture was stirred at room temperature for about 30 minutes to about 24 hours for a diazonium reaction to progress to obtain a diazonium derivative. The concentration of the resulting diazonium derivative was about 8 mM.

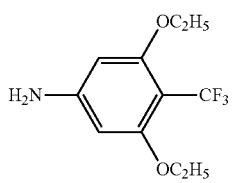

[Formula 11]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 μl of the catalyst composition was coated on a glassy carbon electrode support having a diameter of about 0.5 cm, and then dried at room temperature for about 5 minutes. 7 μl of a 0.05 wt % Nafion solution was dropwise added into the dried product, which was then dried at room temperature for about 10 minutes, thereby manufacturing an electrode. The loading amount of the catalyst was about 85 μg/cm² on the electrode.

Comparative Example 1

Preparation of an Electrode Catalyst and an Electrode for Fuel Cells 2.5 g of the carbonaceous support prepared in Comparative Preparation Example 1 was impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 μl of the catalyst composition was coated on a glassy carbon electrode support having a diameter of about 0.5 cm, and then dried at room temperature for about 5 minutes. 7 μl of a 0.05 wt % Nafion solution was dropwise added into the dried product, which was then dried at room temperature for about 10 minutes, thereby manufacturing an electrode. The loading amount of the catalyst was about 85 μg/cm² on the electrode.

Comparative Example 2

Preparation of an Electrode Catalyst and an Electrode for Fuel Cells 2.5 g of the carbonaceous support of Comparative Preparation Example 1 was dispersed in about 250 mL of a solution of deionized water and ethanol (95:5, v/v). 0.0745 mL (2 mmol) of an amine compound of Formula 8, below, was added into the dispersion and stirred for about 1 hour to obtain a mixture. 0.069 g (4 mmol) of $NaNO_2$ was added into the mixture and then stirred for about 30 minutes, followed by an addition of 5 mL of a 0.5M HCl aqueous solution. The resulting mixture was stirred at room temperature for about 30 minutes to about 24 hours for a diazonium reaction to progress to obtain a diazonium derivative. The concentration of the resulting diazonium derivative was about 2 mM.

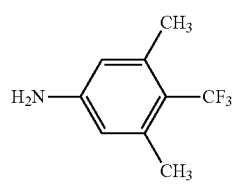

[Formula 8]

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 μl of the catalyst composition was coated on a glassy carbon electrode support having a diameter of about 0.5 cm, and then dried at room temperature for about 5 minutes. 7 μl of a 0.05 wt % Nafion solution was dropwise added into the dried product, which was then dried at room temperature for about 10 minutes, thereby manufacturing an electrode. The loading amount of the catalyst was about 85 μg/cm² on the electrode.

Comparative Example 3

Preparation of an Electrode Catalyst and an Electrode for Fuel Cells 2.5 g of the carbonaceous support prepared in Preparation Example 2 was dispersed in about 250 mL of a solution of deionized water and ethanol (95:5, v/v). 0.2512 mL (8 mmol) of an amine compound of Formula 12, below, was added into the dispersion and stirred for about 1 hour to obtain a mixture. 0.2760 g (16 mmol) of $NaNO_2$ was added into the mixture and then stirred for about 30 minutes, followed by an addition of 5 mL of a 0.5M HCl aqueous solution. The resulting mixture was stirred at room temperature for about 30 minutes to about 24 hours for a diazonium reaction to progress to obtain a diazonium derivative. The concentration of the resulting diazonium derivative was about 8 mM.

[Formula 12]

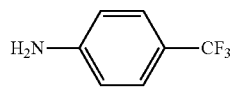

The stirred product was vacuum-filtered, washed with distilled water, methanol, and then acetone, and vacuum-dried for about 24 hours to prepare a carbonaceous support, which was then impregnated with Pt by chemical reduction using an aqueous solution of ethylene glycol in water (0.25:1 by mole) to prepare a catalyst for fuel cells.

0.03 g of the catalyst, 500 mL of a 0.5 wt % Nafion solution (prepared by a dilution of 1/10 of a mixed solvent of 5 wt % of Nafion, 45 wt % of 1-propanol, and 50 wt % of 3-propanol), and 4,500 mL of isopropyl alcohol were mixed together to prepare a catalyst composition. This mixing process was performed by ultrasonication for about 20 minutes, and stirring for about 1 minute.

6 µl of the catalyst composition was coated on a glassy carbon electrode support having a diameter of about 0.5 cm, and then dried at room temperature for about 5 minutes. 7 µl of a 0.05 wt % Nafion solution was dropwise added into the dried product, which was then dried at room temperature for about 10 minutes, thereby manufacturing an electrode. The loading amount of the catalyst was about 85 µg/cm² on the electrode.

Examples 1-8 and Comparative Examples 1-3 are summarized as Table 1 below.

TABLE 1

| | Used carbon support | Used amine compound | Amine compound concentration (mM) | $NaNO_2$ concentration (mM) | Diazonium derivative concentration (mM) |
|---|---|---|---|---|---|
| Example 1 | Preparation Example 2 | Formula 8 | 2 | 4 | 2 |
| Example 2 | Preparation Example 2 | Formula 8 | 4 | 8 | 4 |
| Example 3 | Preparation Example 2 | Formula 8 | 8 | 16 | 8 |
| Example 4 | Preparation Example 2 | Formula 8 | 16 | 32 | 16 |

TABLE 1-continued

| | Used carbon support | Used amine compound | Amine compound concentration (mM) | NaNO₂ concentration (mM) | Diazonium derivative concentration (mM) |
|---|---|---|---|---|---|
| Example 5 | Preparation Example 2 | Formula 8<br>H₂N–C₆H₂(CH₃)₂(CF₃) (3,5-dimethyl-4-trifluoromethylaniline) | 32 | 64 | 32 |
| Example 6 | Preparation Example 2 | Formula 9<br>H₂N–C₆H₂(C₂H₅)₂(CF₃) (3,5-diethyl-4-trifluoromethylaniline) | 8 | 16 | 8 |
| Example 7 | Preparation Example 2 | Formula 10<br>H₂N–C₆H₂(OCH₃)₂(CF₃) (3,5-dimethoxy-4-trifluoromethylaniline) | 8 | 16 | 8 |
| Example 8 | Preparation Example 2 | Formula 11<br>H₂N–C₆H₂(OC₂H₅)₂(CF₃) (3,5-diethoxy-4-trifluoromethylaniline) | 8 | 16 | 8 |
| Comparative Example 1 | Comparative Preparation Example 1 | — | — | — | — |
| Comparative Example 2 | Comparative Preparation Example 1 | Formula 8<br>H₂N–C₆H₂(CH₃)₂(CF₃) | 2 | 4 | 2 |
| Comparative Example 3 | Preparation Example 2 | Formula 12<br>H₂N–C₆H₄–CF₃ | 8 | 16 | 8 |

Example 9

Manufacture of MEA

The electrode of Example 1 was cut into a cathode and an anode, each having a size of 2.8 cm×2.8 cm. The cathode and the anode with a polymer electrolyte membrane (poly (tetrafluoroethylene (PTFE) Teflon®, available from DuPont) having a thickness of about 15 μm to about 20 μm therebetween were assembled into a membrane-electrode assembly (MEA).

Examples 10-16

Manufacture of MEAs

MEAs were manufactured in the same manner as in Example 9, except that the electrodes of Examples 2 to 8, instead of the electrode of Example 1, were cut into cathodes and anodes in a size of 2.8 cm×2.8 cm.

Comparative Examples 4-6

Manufacture of MEAs

MEAs were manufactured in the same manner as in Example 9, except that the electrodes of Comparative Examples 1 to 3, instead of the electrode of Example 1, were cut into cathodes and anodes in a size of 2.8 cm×2.8 cm.

Analysis Example 1

Raman Spectrum Analysis

Figure 4:
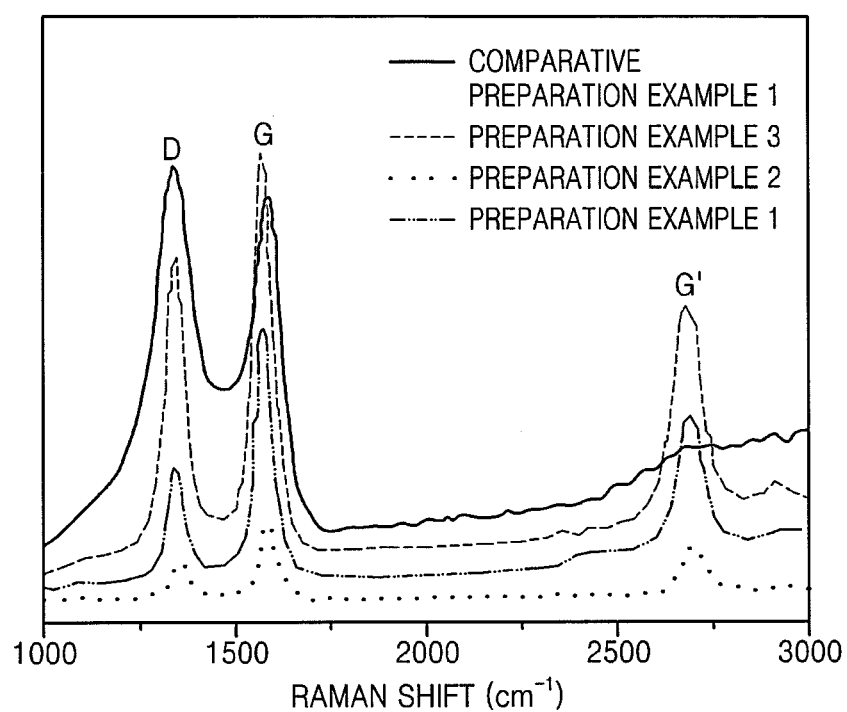
FIG. 4 illustrates a Raman spectra of carbonaceous supports of Preparation Examples 1 to 3 and Comparative Preparation Example 1.

The carbonaceous supports of Preparation Examples 1 to 3 and Comparative Preparation Example 1 were analyzed by Raman spectroscopy (using a Raman spectrometer system available from JASCO Inc.) using a laser having a wavelength of 514.5 mm to obtain maximum peak intensities of G bands at about 1,575 $cm^{-1}$ to about 1,600 $cm^{-1}$ and maximum peak intensities of D bands at about 1,340 $cm^{-1}$ to about 1,360 $cm^{-1}$. The results are shown in FIG. 4.

A maximum peak intensity ratio ($I_D/I_G$) of G bands at about 1,575 $cm^{-1}$ to about 1,600 $cm^{-1}$ to D bands at about 1,340 $cm^{-1}$ to about 1,360 $cm^{-1}$ in each carbon support was calculated. The results are shown in Table 2 below.

TABLE 2

| Example | Maximum peak intensity ratio ($I_D/I_G$) of G band at about 1,575 $cm^{-1}$ to about 1,600 $cm^{-1}$ to D band at about 1,340 $cm^{-1}$ to about 1,360 $cm^{-1}$ |
|---|---|
| Preparation Example 1 | 0.50 |
| Preparation Example 2 | 0.58 |
| Preparation Example 3 | 0.81 |
| Comparative Preparation Example 1 | 2.46 |

Referring to Table 2 and FIG. 4, the carbonaceous supports of Preparation Examples 1 to 3 had a $I_D/I_G$ of about 0.50 to about 0.81, while the carbon support of Comparative Preparation Example 1 had a $I_D/I_G$ of about 2.46. These results indicate that the carbonaceous supports of Preparation Examples 1 to 3 had higher crystallinity than the carbonaceous support of Comparative Preparation Example 1, and retained inherent characteristics of carbon.

Analysis Example 2

Transmission Electron Microscope (TEM) Analysis

Surfaces of the carbonaceous supports of Example 3 and Comparative Preparation Example 1 were observed using a transmission electron microscope (TEM, Model: TEM-2100-F, available from JEOL Ltd.). The results are shown in FIGS. 5A and 5B.

Figure 5A:
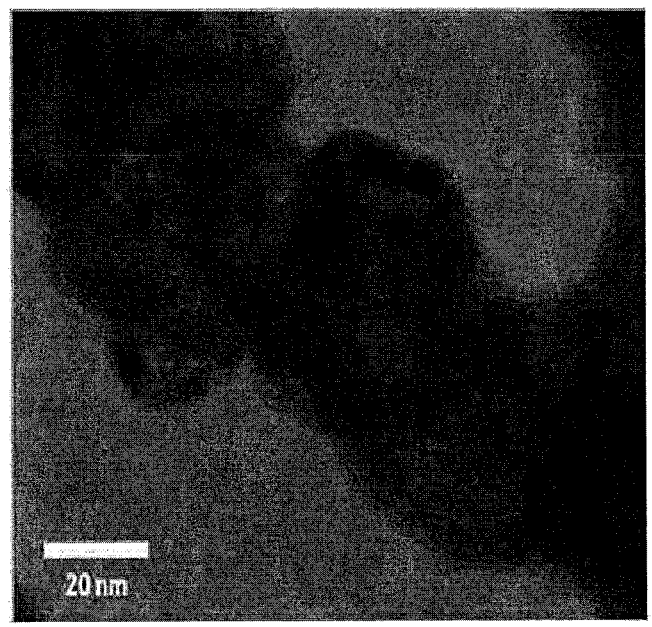
FIG. 5A illustrates a transmission electron microscope (TEM) image of a carbonaceous support of Example 3.
Figure 5B:
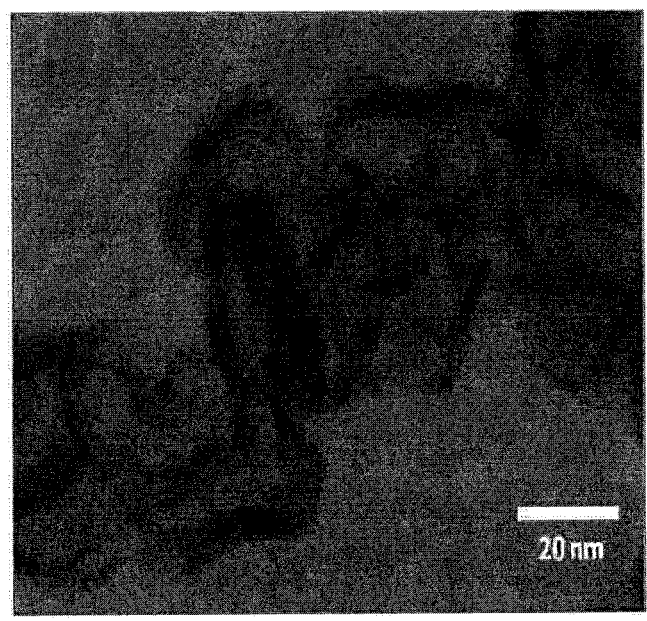
FIG. 5B illustrates a TEM image of a carbonaceous support of Comparative Preparation Example 3.

Referring to FIG. 5A, the carbonaceous support of Example 3 appeared to have a surface with a more uniformly grown monolayer, compared to the carbonaceous support of Comparative Preparation Example 3 in FIG. 5B.

A test by TEM was performed to determine the particle size distribution of the electrode catalyst particles for a fuel cell prepared in Example 3. The results are shown in FIG. 6.

The results of the particle size distribution test on the electrode catalyst particles of Example 3 were obtained through morphological analysis by TEM, i.e., by image processing of 200 or more Pt nanoparticles based on the TEM image.

Figure 6:
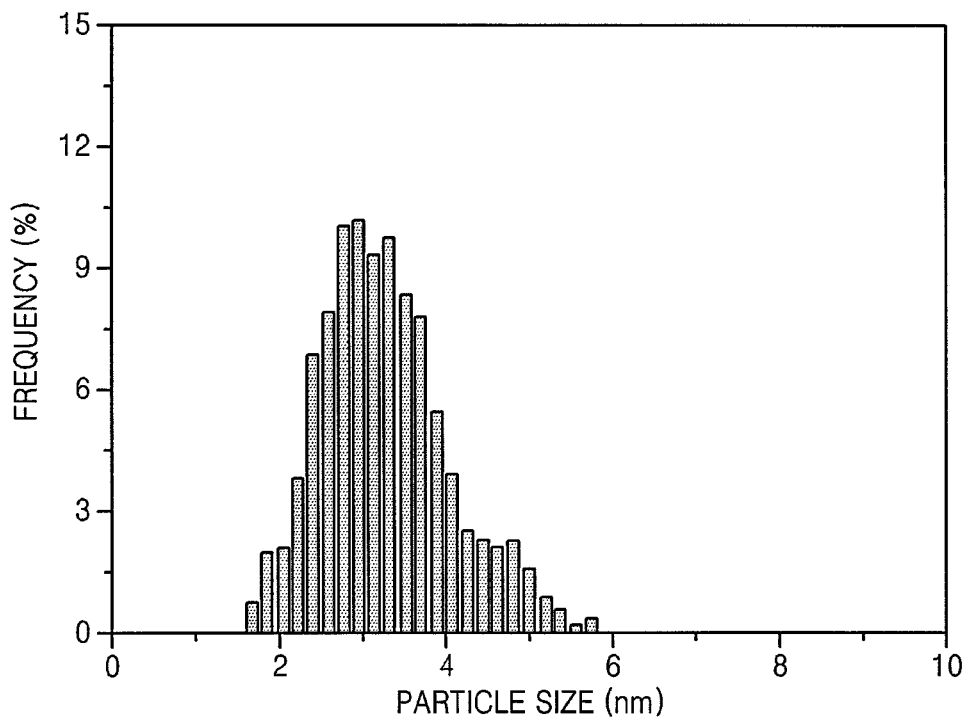
FIG. 6 illustrates a graph of particle size distribution of an electrode catalyst of Example 3 for a fuel cell.

Referring to FIG. 6, the electrode catalyst of Example 3 was found to have an average particle diameter (D50) of about 3.26±0.72.

Analysis Example 3

Thermogravimetric Analysis (TGA)

Thermogravimetric analysis (TGA) was performed on the carbonaceous supports of Preparation Examples 1 to 3 and Comparative Preparation Example 1, using a TGA system (SDF-2960 TGA, available from TA Instruments). About 4.5±0.3 mg of each of the carbonaceous supports of Preparation Examples 1 to 3 and Comparative Preparation Example 1 was loaded into a sealed aluminum pan, followed by analysis on a silicon water in an oxygen atmosphere with a temperature rise at a rate of about 10° C./min from about 50° C. to about 1,000° C. The results are shown in FIG. 7.

Figure 7:
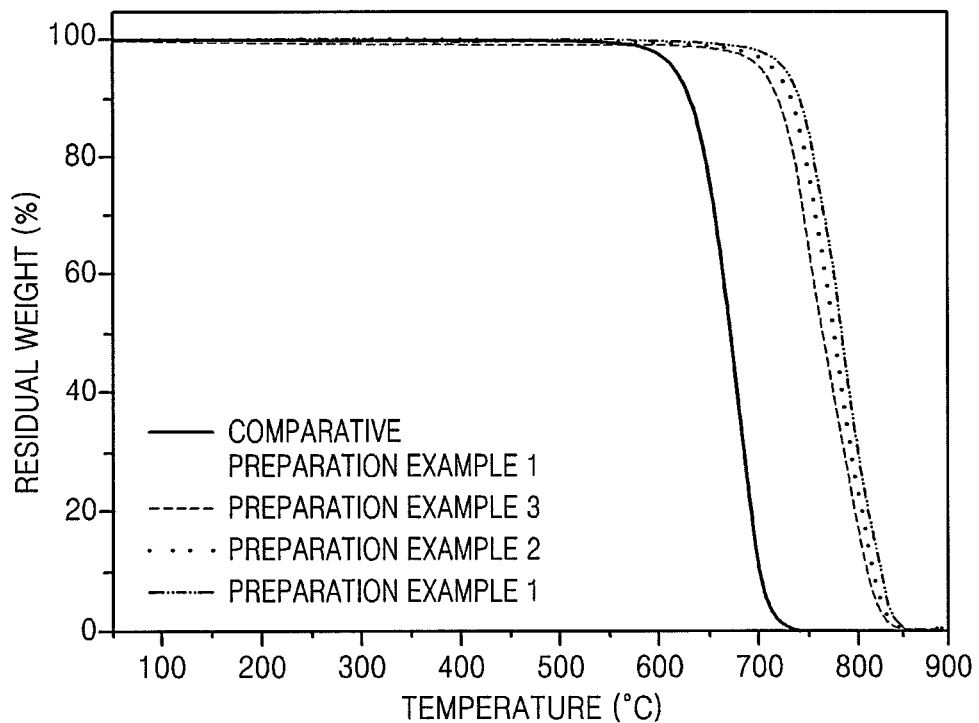
FIG. 7 is a graph illustrating the results of thermogravimetric analysis (TGA) on carbonaceous supports of Preparation Examples 1 to 3 and Comparative Preparation Example 1.

Referring to FIG. 7, the carbonaceous supports of Preparation Examples 1 to 3 were found to remain at up to about 850° C., while the carbonaceous support of Comparative Preparation Example 1 remained at up to about 730° C. These results indicate that the carbonaceous supports of Preparation Examples 1 to 3 were found to have better thermal stability than the carbonaceous supports of Comparative Preparation Example 1.

Analysis Example 4

X-Ray Photoelectron Spectroscopic (XPS) Analysis

After being dried at about 100° C. in a vacuum for about 4 hours, the electrode catalyst for fuel cells prepared in Example 3 and the carbonaceous support of Preparation Example 2 were subjected to an X-ray photoelectron spectroscopy (XPS) test. The results are shown in FIG. 8.

The XPS test was performed using an ESCALAB 220-I system (available from VG Scientific) with MgKα radiation (1,253.6 eV) as an X-ray source. In the XPS test, photoelectrons emitting from the surface of the electrode catalyst of Example 3 and the surface of the carbonaceous support of Preparation Example 2 were analyzed using a hemispherical analyzer. Survey XPS spectra were collected at 0~1,100 eV with a pass energy of about 46.95 eV, and high resolution spectra were collected with a pass energy of about 23.5 eV. All spectra were taken at a 30° take-off angle with reference to the C1s peaks at a binding energy of about 284.6 eV. Cutting fit of non-linear XPS spectra was performed with the XPSPEAK95 software (available from VG).

Figure 8:
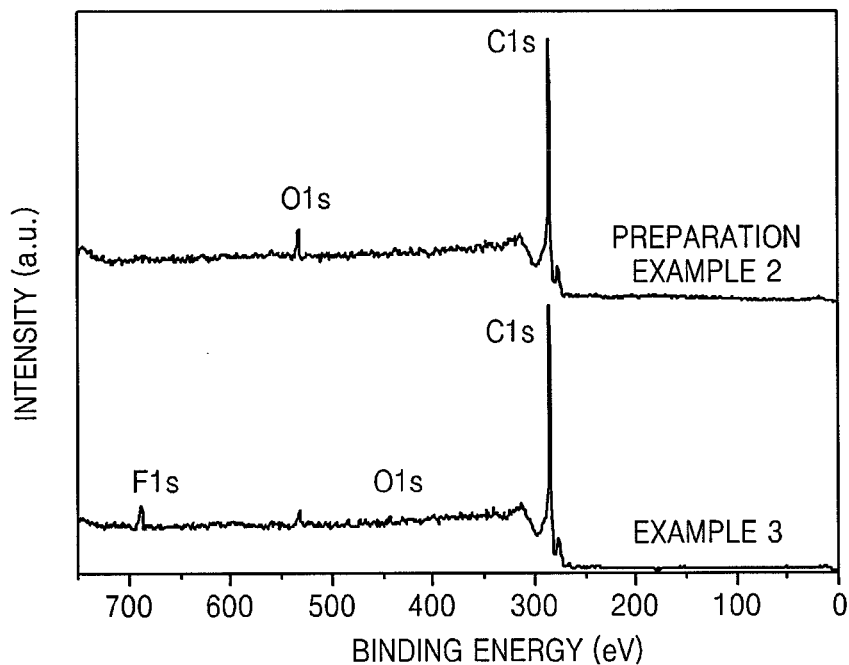
FIG. 8 illustrates X-ray photoelectron spectra of the electrode catalyst of Example 3 and the carbonaceous support of Preparation Example 2.

Referring to FIG. 8, the electrode catalyst of Example 3 exhibited F1s core level spectra, indicating the carbonaceous support in the electrode catalyst included a fluorinated functional group. Meanwhile, no F1s core level spectra appeared in the carbonaceous support of Preparation Example 2, indicating that no fluorinated functional group was in the carbonaceous support of Preparation Example 2.

The doped amount of fluorine (F) and a mole ratio of the doped fluorine to carbon (F/C) with respect to the concentration of diazonium derivative in the carbonaceous support in each of the electrode catalysts of Examples 1 to 5 were calculated using the exponential decay equation of Equation 1 below.

Figure 9:
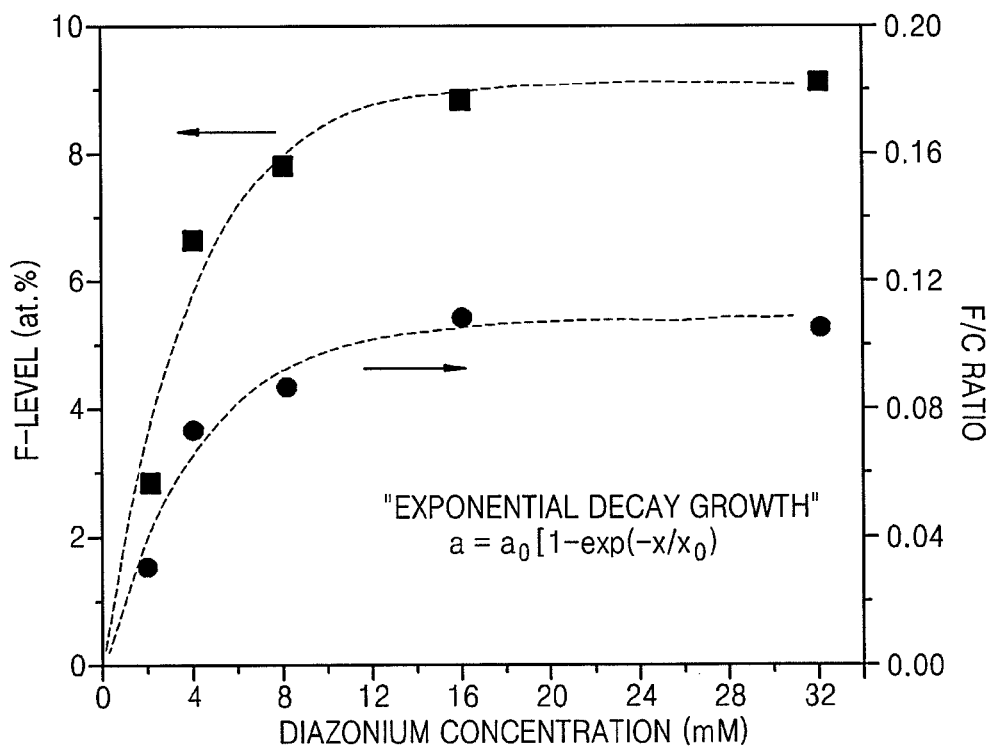
FIG. 9 illustrates a graph of doped fluorine (F) content and mole ratio of doped fluorine to carbon (F/C) with respect to diazonium derivatives concentration in the carbonaceous supports of the electrode catalysts of Examples 1 to 5 for fuel cells.
Figure 10:
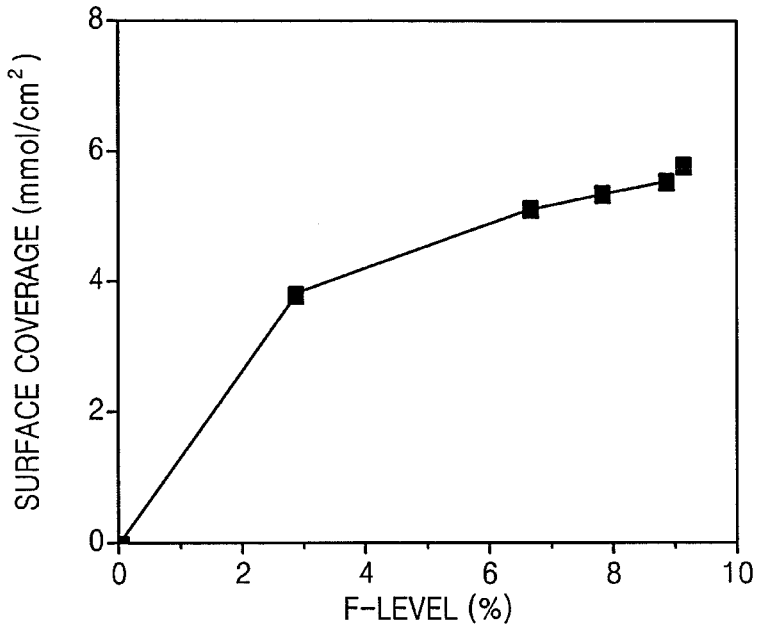
FIG. 10 illustrates a graph of surface coverage with respect to amount of doped fluorine (F) in the carbonaceous supports of the electrode catalysts of Examples 1 to 5 for fuel cells.

The doped concentration (mM) of fluorine (F) in the carbonaceous support per unit area of 1 cm$^2$ of each of the electrode catalysts of Examples 1 to 5 was calculated as surface coverage. The results are shown in FIGS. 9 and 10, and Table 3.

$$\alpha = \alpha_0[1-\exp(-\chi/\chi_0)] \qquad \text{<Equation 1>}$$

In Equation 1, α indicates the doped amount of fluorine (F), $\alpha_0$ indicates the saturated amount of doped fluorine (F) or a mole ratio of doped fluorine to carbon (F/C), χ indicates the concentration of diazonium derivative, and $\chi_0$ indicates the saturated concentration of diazonium derivative.)

TABLE 3

| Example | Doped amount of fluorine (F) (at %) | Mole ratio of doped fluorine to carbon (F/C) | Surface coverage (mM/cm$^2$) |
|---|---|---|---|
| Example 1 | 2.87 | 0.03094 | 3.84 |
| Example 2 | 6.64 | 0.07456 | 5.15 |
| Example 3 | 7.80 | 0.08736 | 5.37 |
| Example 4 | 8.85 | 0.10822 | 5.56 |
| Example 5 | 9.14 | 0.10522 | 5.77 |

Referring to Table 3 and FIGS. 9 and 10, with increases in the concentration of diazonium derivative from 2 mM to 32 mM in the carbonaceous supports of the electrode catalysts of Examples 1 to 5, the doped amount of fluorine (F), the mole ratio of doped fluorine to carbon (F/C), and the surface coverage were increased from 2.87 at % to 9.14 at %, from 0.03094 to 0.10822, and from 3.84 mM/cm$^2$ to 5.77 mM/cm$^2$, respectively.

Analysis Example 5

Accelerated Lifetime Analysis

An accelerated lifetime test was performed on the electrode catalyst of Example 3. The accelerated lifetime test was performed by cyclic voltammetry (1,000 cycles) using the electrode of Example 3 and Ag/AgCl as a standard electrode at about 25° C. in a 0.1 M HClO$_4$ aqueous solution with a standard hydrogen potential of about 0.6 V to about 1.4 V. The results are shown in FIG. 11.

Figure 11:
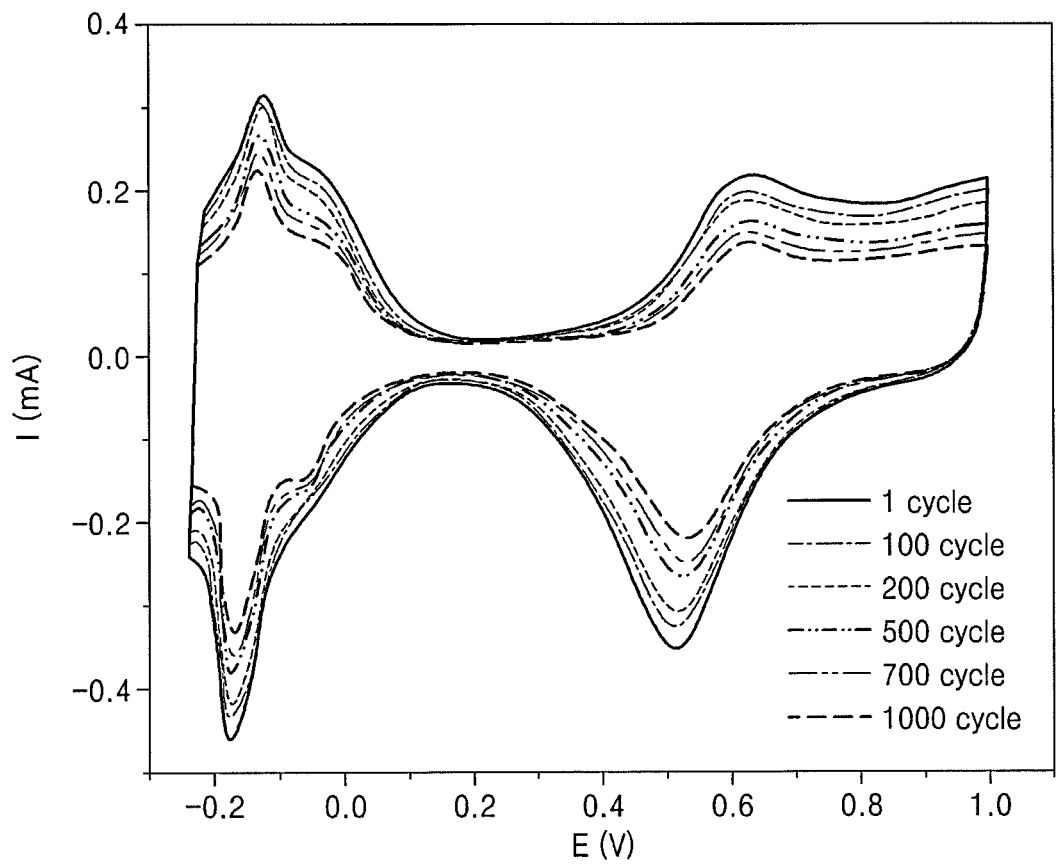
FIG. 11 illustrates a graph of current versus voltage in the electrode catalyst of Example 3 for a fuel cell for 1,000 times of cycling in an accelerated lifetime test.

Referring to FIG. 11, voltage-current curves of the electrode catalyst of Example 3 up to the 1,000$^{th}$ cycle were similar, indicating high stability of the electrode catalyst of Example 3.

An accelerated lifetime test was also performed on the electrodes catalysts of Comparative Examples 1 to 3 in the same manner as on the electrode catalyst of Example 3, with sweeping every 100$^{th}$ cycle at a scan rate of about 20 mV/sec. A reduction ratio of electrochemical surface area was calculated using Equation 2 and normalized. The results are shown in FIG. 12.

Electrochemical surface area reduction
ratio=Measured surface area/Initial surface area  <Equation 2>

Figure 12:
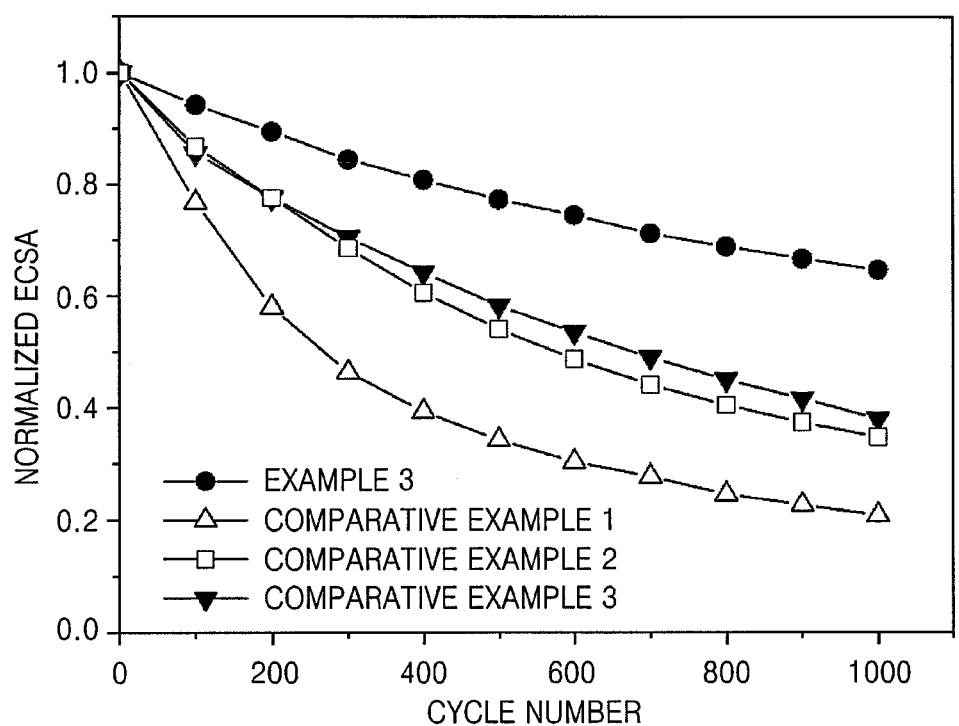
FIG. 12 illustrates a graph of normalized electrochemical surface area (ECSA) reduction ratio with respect to number of cycles in the electrode catalysts of Example 3 and Comparative Examples 1 to 3 for fuel cells.

Referring to FIG. 12, a reduction ratio in electrochemical surface area of the electrode catalyst of Example 3 was smaller than those in the electrode catalysts of Comparative Examples 1 to 3. This indicates that the electrode catalyst of Example 3 was less deteriorated with repeated cycles than the electrode catalysts of Comparative Examples 1 to 3.

Analysis Example 6

MEA's Performance Analysis

Performance of the MEAs of Example 11 and Comparative Example 5 was analyzed at 0 kPa, a relative humidity (RH) of 100% (cathode and anode) and 80° C., and at 150 kPa, a RH of 50% (cathode and anode) and 80° C. The results are shown in FIGS. 13A and 13B.

Figure 13A:
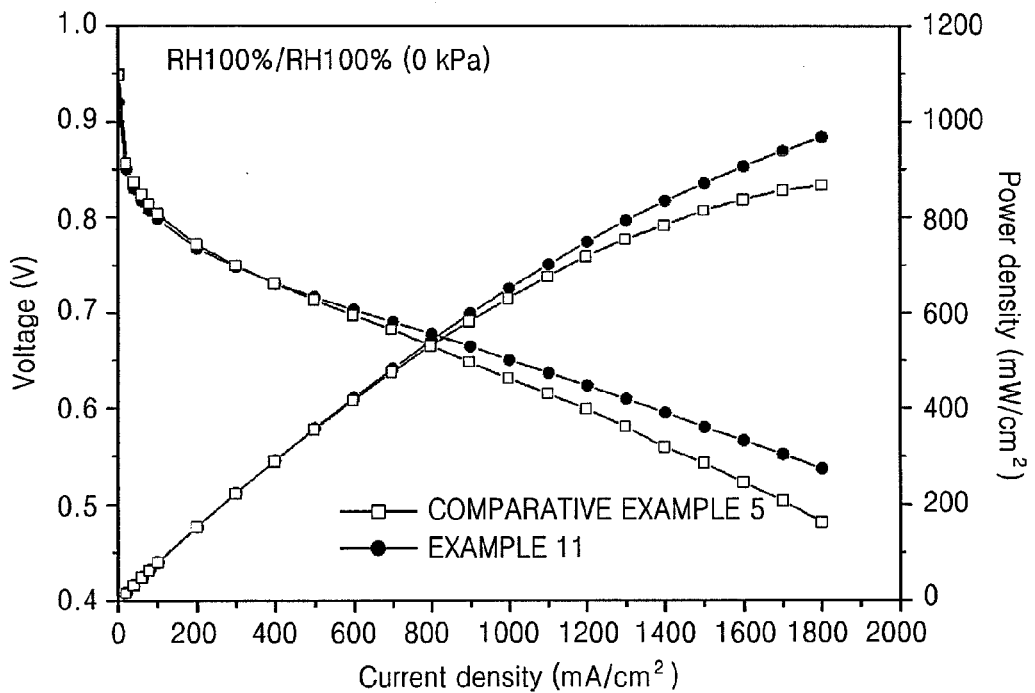
FIG. 13A illustrates a graph of voltage and power density with respect to current density in membrane electrode assemblies (MEAs) of Example 11 and Comparative Example 5 at 0 kPa, a relative humidity (RH) of 100% (cathode and anode) and 80° C.
Figure 13B:
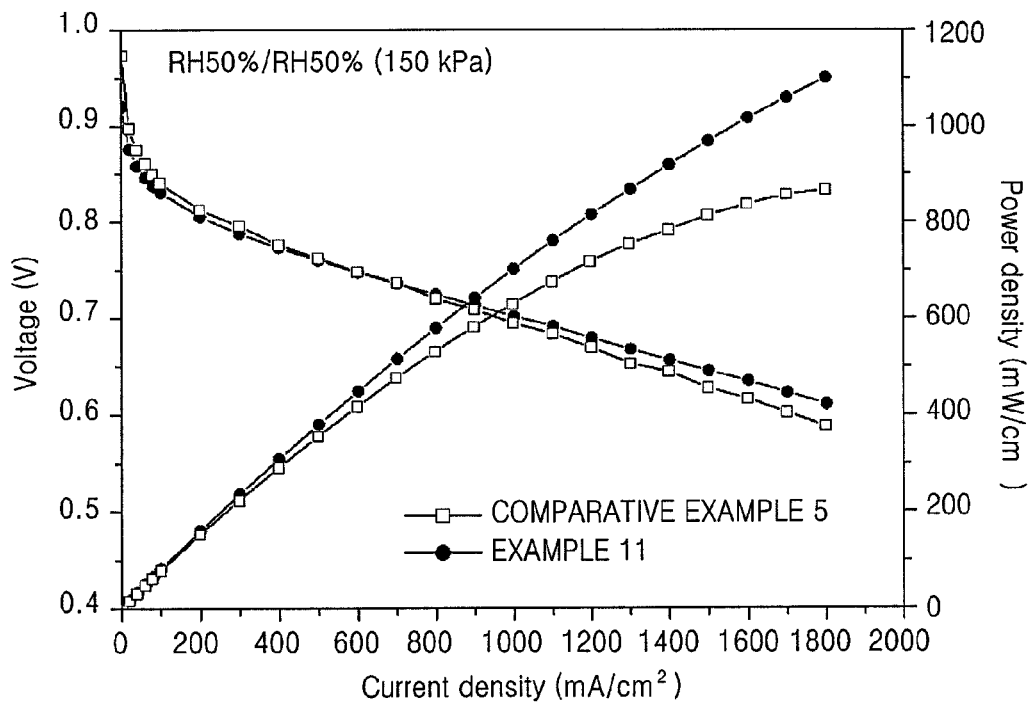
FIG. 13B illustrates a graph of voltage and power density with respect to current density in the MEAs of Example 11 and Comparative Example 5 at 150 kPa, a RH of 50% (cathode and anode) and 80° C.

Referring to FIGS. 13A and 13B, the MEA of Example 11 had a higher voltage and a higher power density compared to the MEA of Comparative Example 5. This indicates that the MEA of Example 11 had better performance than the MEA of Comparative Example 5.

Analysis Example 7

MEA's Durability Analysis

Voltage loss with time at a current density of about 1.5 A/cm$^2$ in the MEAs of Example 11 and Comparative Example 5, and voltage loss with respect to time or cycle number at a current density of about 0.8 A/cm$^2$ in the same MEAs were analyzed. The results are shown in FIGS. 14A and 14B.

Figure 14A:
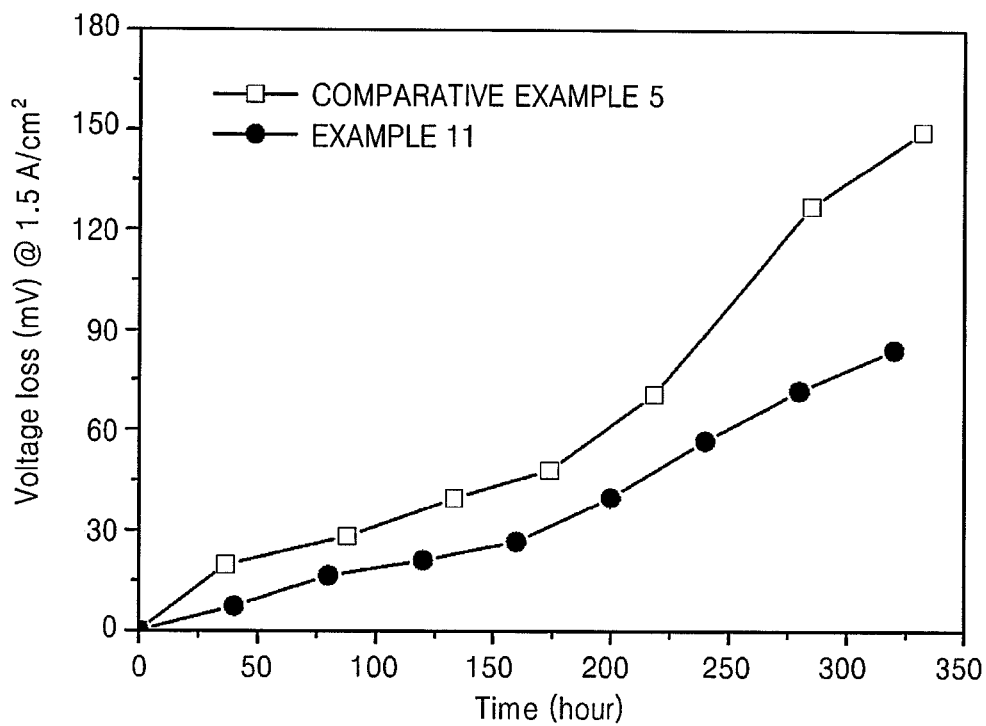
FIG. 14A illustrates a graph of voltage loss with respect to time at a current density of 1.5 A/cm$^2$ in the MEAs of Example 11 and Comparative Example 5.
Figure 14B:
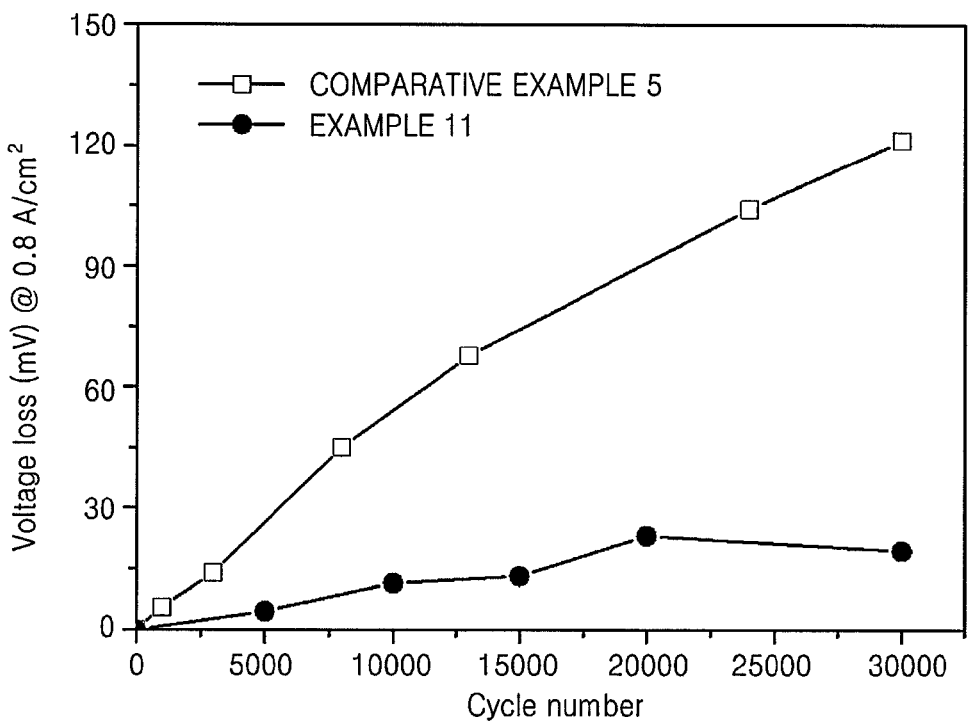
FIG. 14B is a graph of voltage loss with respect to cycle number at a current density of 0.8 A/cm$^2$ in the MEAs of Example 11 and Comparative Example 5.

Referring to FIGS. 14A and 14B, voltage losses with time or with cycle number were smaller in the MEA of Example 1 than in the MEA of Comparative Example 5, indicating that the MEA of Example 11 has improved durability compared to the MEA of Comparative Example 5.

By way of summation and review, a catalyst layer may contain a catalyst of metal particles loaded on a conductive support, and a polymer electrolyte. For example, a Pt/C electrode catalyst may include Pt particles of a size of 2 nm to 5 nm loaded on a carbonaceous support having a large specific surface area.

However, corrosion of the carbonaceous support and dissolution, Oswald ripening, and aggregation of the catalyst metal particles during operation of a PEMFC may lead to a sharp reduction in electrochemical surface area (ECSA) of the catalyst metal particles, thereby impeding growth into a homogeneous monolayer. Accordingly, durability of the electrode catalyst may be lowered.

Therefore, an electrode catalyst with improved durability and improved performance and that is able to grow as a uniform monolayer may be desirable.

The embodiments provide an electrode catalyst for fuel cells that has improved durability and improved performance and is able to grow as a homogeneous monolayer.

As described above, according to the one or more embodiments, an electrode catalyst for a fuel cell may include at least one of the functional groups of Formulae 1 and 2 above bound to a surface of a carbonaceous support, and may be able to grow as a uniform monolayer. An electrode, an MEA, and a fuel cell, each including the electrode catalyst, may have improved durability and improved performance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrode catalyst for a fuel cell, the electrode catalyst comprising:
   a carbonaceous support, and
   a catalyst metal loaded on the carbonaceous support,
   wherein:
   the carbonaceous support includes a functional group bound on a surface thereof, the functional group being represented by Formula 3, below,

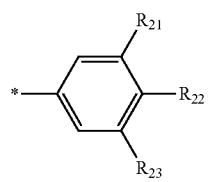

Formula 3 wherein, in Formula 3:
$R_{22}$ is a C1-C10 fluoroalkyl group, a C1-C10 fluoroalkoxy group, a C6-C10 fluoroaryl group, —NH$_2$, —SH, —CN, —SO$_3$H, —COOH, or a combination thereof, and
$R_{21}$ and $R_{23}$ are each independently a substituted or unsubstituted C1-C40 alkyl group, a substituted or unsubstituted C1-C40 alkoxy group, a substituted or unsubstituted C6-C40 aryl group, or a combination thereof.

2. The electrode catalyst as claimed in claim 1, wherein the functional group represented by Formula 3 is represented by one of the following Formulae 4 to 7:

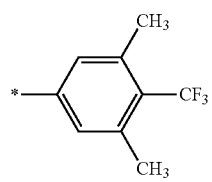

Formula 4

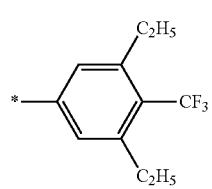

Formula 5

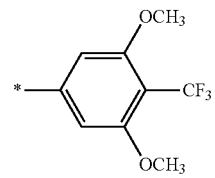

Formula 6

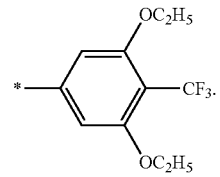

Formula 7

3. The electrode catalyst as claimed in claim 1, wherein the carbonaceous support includes at least one of carbon powder, carbon black, acetylene black, ketjen black, active carbon, carbon nanotubes, carbon nanofibers, carbon nanowires, carbon nanohorns, ordered nanoporous carbon, carbon aerogels, carbon cryogels, carbon nanorings, carbon nanocage, and mesoporous carbon.

4. The electrode catalyst as claimed in claim 1, wherein a doped amount of fluorine in the carbonaceous support is about 0.1 at. % to about 10 at. %.

5. The electrode catalyst as claimed in claim 4, wherein a mole ratio of the doped fluorine to carbon (F/C) in the carbonaceous support is about 0.0001 to about 0.5.

6. The electrode catalyst as claimed in claim 1, wherein the carbonaceous support has a specific surface area of about 50 m$^2$/g to about 800 m$^2$/g.

7. The electrode catalyst as claimed in claim 1, wherein the catalyst metal includes at least one of platinum, iron, cobalt, nickel, ruthenium, rhodium, palladium, osmium, iridium, copper, silver, gold, tin, titanium, chromium, and alloys thereof.

8. The electrode catalyst as claimed in claim 1, wherein the electrode catalyst has a D50 average particle diameter of about 1.5 nm to about 8.0 nm.

9. The electrode catalyst as claimed in claim 1, wherein the carbonaceous support is prepared by thermally treating carbon at a temperature of about 1,500° C. to about 3,000° C.

10. The electrode catalyst as claimed in claim 1, wherein the functional group represented by Formula 3 is arranged in a uniform monolayer on the surface of the carbonaceous support.

11. The electrode catalyst as claimed in claim 1, wherein the carbonaceous support has a maximum peak intensity ratio of D band to G band (ID/IG) of about 0.1 to about 1.0, the G band appearing at about 1,575 cm$^{-1}$ to about 1,600 cm$^{-1}$, the D band appearing at about 1,340 cm$^{-1}$ to about 1,360 cm$^{-1}$, as analyzed by Raman spectroscopy using a laser of 514.5 nm wavelength.

12. The electrode catalyst as claimed in claim 1, wherein the carbonaceous support has a peak of a 002 plane that appears at a Bragg angle 2θ of 26.4°±0.1° and that has a full width at half maximum of about 0.2° to about 0.7°, in an X-ray diffraction spectrum.

13. The electrode catalyst as claimed in claim 1, wherein, in Formula 3, $R_{21}$ and $R_{23}$ are each independently a substituted or unsubstituted C1-C40 alkyl group or a substituted or unsubstituted C1-C40 alkoxy group.

14. The electrode catalyst as claimed in claim 1, wherein, in Formula 3, $R_{21}$ and $R_{23}$ are each independently one of a methyl group, an ethyl group, a methoxy group, or an ethoxy group.

15. The electrode catalyst as claimed in claim 1, wherein the functional group forms a functional layer that forms a barrier that suppresses migration or aggregation of catalyst metal particles.

16. The electrode catalyst as claimed in claim 1, wherein, in Formula 3, $R_{21}$ and $R_{23}$ are the same.

17. An electrode for a fuel cell, the electrode including the electrode catalyst as claimed in claim 1.

18. A fuel cell, the fuel cell including the electrode as claimed in claim 17.

19. A membrane electrode assembly for a fuel cell, the membrane electrode assembly including the electrode catalyst as claimed in claim 1.

* * * * *